(12) United States Patent
Wallis et al.

(10) Patent No.: US 11,941,550 B2
(45) Date of Patent: *Mar. 26, 2024

(54) SYSTEMS FOR SHARED VEHICLE ACCESS

(71) Applicant: Geotab Inc., Oakville (CA)

(72) Inventors: Thomas James Wallis, Kitchener (CA); Benjamin John Gordon Gaffney, Wellesley (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,399

(22) Filed: Apr. 13, 2023

(65) Prior Publication Data
US 2023/0252367 A1    Aug. 10, 2023

Related U.S. Application Data

(63) Continuation of application No. 17/725,675, filed on Apr. 21, 2022, now Pat. No. 11,657,338.

(60) Provisional application No. 63/270,844, filed on Oct. 22, 2021.

(51) Int. Cl.
*G06Q 10/02* (2012.01)
*G06Q 30/0645* (2023.01)

(52) U.S. Cl.
CPC ......... *G06Q 10/02* (2013.01); *G06Q 30/0645* (2013.01)

(58) Field of Classification Search
None
See application file for complete search history.

(56) References Cited

U.S. PATENT DOCUMENTS

| | | | |
|---|---|---|---|
| 8,768,565 B2 | 7/2014 | Jefferies et al. | |
| 9,442,888 B2 | 9/2016 | Stanfield et al. | |
| 9,807,547 B1 | 10/2017 | Oesterling et al. | |
| 9,818,151 B2 | 11/2017 | Ehrman | |
| 9,845,071 B1 | 12/2017 | Krishnan | |
| 10,106,172 B2 | 10/2018 | Wingfield et al. | |
| 10,229,601 B2 | 3/2019 | Oesterling et al. | |
| 11,447,097 B1 | 9/2022 | Flick | |
| 2011/0112969 A1 | 5/2011 | Zaid et al. | |
| 2013/0338883 A1 | 12/2013 | Savoure | |
| 2017/0178035 A1 | 6/2017 | Grimm et al. | |
| 2017/0186251 A1 | 6/2017 | Lee | |
| 2017/0207916 A1 | 7/2017 | Luce | |

(Continued)

FOREIGN PATENT DOCUMENTS

GB    2402840 A    12/2004

OTHER PUBLICATIONS

EESR dated Feb. 16, 2023, European Patent Office.
Co-Pending U.S. Appl. No. 63/227,375, filed Jul. 30, 2021, 49 Pages.

*Primary Examiner* — Tonya Joseph
(74) *Attorney, Agent, or Firm* — Mark J. Pringle-Rigby

(57) ABSTRACT

The present systems, devices, and methods relate to managing shared vehicle access. Vehicle access can be provided to a candidate user based on whether the user is included in a list of at least one user associated with a respective virtual key. Virtual keys can be created, or lists of at least one user can be updated to include the candidate user, to in turn provide vehicle access. Virtual keys can be stored in a plurality of virtual key slots, with vehicle access being provided based on a virtual key stored in an active key slot. Status reports can be sent to a reservation management device, for updating virtual keys or lists of at least one user.

24 Claims, 5 Drawing Sheets

(56) References Cited

U.S. PATENT DOCUMENTS

| | | |
|---|---|---|
| 2017/0234057 A1 | 8/2017 | Yardley |
| 2017/0308817 A1 | 10/2017 | Miller et al. |
| 2017/0316535 A1 | 11/2017 | Hirose et al. |
| 2018/0047220 A1 | 2/2018 | Savoure et al. |
| 2019/0001926 A1 | 1/2019 | Arakawa et al. |
| 2019/0092279 A1 | 3/2019 | Jarvis et al. |
| 2019/0109855 A1 | 4/2019 | Takeuchi et al. |
| 2019/0156605 A1 | 5/2019 | Tang et al. |
| 2019/0259227 A1 | 8/2019 | Oesterling et al. |
| 2019/0362575 A1 | 11/2019 | Nallaperumal et al. |

| Virtual Key ID | Beginning Time Stamp | Ending Time Stamp |
|---|---|---|
| 610 | t1 | t1+4000 |
| 620 | t1+100 | t1+3000 |
| 630 | t1+200 | t1+2000 |
| 640 | t1+300 | t1+500 |
| 650 | t1+400 | t1+1000 |

SYSTEMS FOR SHARED VEHICLE ACCESS

PRIOR APPLICATION DATA

This application is a continuation of U.S. patent application Ser. No. 17/725,675 titled "Systems for Shared Vehicle Access", filed on Apr. 21, 2022, which claims priority to U.S. Provisional Patent Application No. 63/270,844 titled "Systems, Devices, and Methods for Shared Vehicle Access", filed on Oct. 22, 2021.

TECHNICAL FIELD

The present disclosure generally relates to systems, devices, and methods for managing shared vehicles, and in particular relates to controlling access to shared vehicles.

BACKGROUND

In many scenarios, it is desirable for a vehicle or plurality of vehicles to be shared between different users. As one example, a commercial vehicle fleet may include a plurality of vehicles which are operated by rotating drivers. As another example, a vehicle rental agency may have a plurality of vehicle, which are rented out to different users. To provide vehicle access to different users, it is desirable to have systems, devices, or methods for assigning, identifying, or checking vehicle access privileges of candidate users in order to provide or deny vehicle access appropriately.

SUMMARY

According to a broad aspect, the present disclosure describes a method for managing shared access to a vehicle including a vehicle device, the method comprising: storing, by a first at least one non-transitory processor-readable storage medium of the vehicle device, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a candidate user, where credentials for the candidate user are received by the vehicle device, determining by a first at least one processor of the vehicle device, whether the candidate user is included in a list of the plurality of lists; if the candidate user is included in a list of the plurality of lists: determining, by the first at least one processor of the vehicle device, a virtual key associated with the list in which the candidate user is included and a set of vehicle access privileges associated with the determined virtual key; and providing vehicle access to the candidate user in accordance with the determined set of vehicle access privileges; and if the candidate user is not included in a list of the plurality of lists: communicating, by a communication interface of the vehicle device, the credentials of the candidate user for reception by a reservation management device; receiving, by the communication interface of the vehicle device from the reservation management device, an indication of vehicle access privileges of the candidate user; and providing vehicle access to the candidate user in accordance with the vehicle access privileges indicated in the indication of vehicle access privileges.

Receiving an indication of vehicle access privileges of the candidate user may comprise: receiving, by the communication interface of the vehicle device from the reservation management device, a specified list of at least one user including the candidate user associated with a specified virtual key which is associated with a specified set of vehicle access privileges; and providing vehicle access to the candidate user in accordance with the vehicle access privileges provided in the indication of vehicle access privileges may comprise: providing vehicle access to the candidate user in accordance with the specified set of vehicle access privileges. The method may further comprise: updating, by a second at least one processor of the reservation management device, an existing list of at least one user associated with an existing virtual key to include the candidate user; and sending, by a communication interface of the reservation management device, the updated list of at least one user. The method may further comprise: receiving, by the communication interface of the vehicle device from the reservation management device, the specified virtual key. The method may further comprise: creating, by a second at least one processor of the reservation management device, the specified virtual key and the specified list of at least one user associated with the specified virtual key; and sending, by a communication interface of the reservation management device, the specified virtual key and the specified list of at least one user to be received by the vehicle device.

Storing the plurality of virtual keys may comprise: storing the plurality of virtual keys in a plurality of virtual key slots on the first at least one non-transitory processor-readable storage medium, each virtual key of the plurality of virtual keys stored in a respective virtual key slot of the plurality of virtual key slots. The plurality of virtual key slots may include one active virtual key slot and a plurality of non-active virtual key slots, access to the vehicle may be controlled according to a set of vehicle access privileges associated with a virtual key stored in the active virtual key slot, and the method may further comprise: if the candidate user is included in a list of the plurality of lists: providing vehicle access to the candidate user in accordance with the determined set of vehicle access privileges includes storing the determined virtual key in the active key slot; and if the candidate user is not included in a list of the plurality of lists: providing vehicle access to the candidate user in accordance with the vehicle access privileges indicated in the indication of vehicle access privileges may include storing a virtual key associated with the vehicle access privileges provided in the indication of vehicle access privileges in the active virtual key slot. Storing the determined virtual key in the active virtual key slot may comprise copying the determined virtual key to the active virtual key slot. The plurality of non-active virtual key slots may include four non-active-virtual key slots.

Each virtual key of the plurality of virtual keys may be associated with an expiry time, and the method may further comprise: removing, from the first at least one non-transitory processor-readable storage medium, keys of the plurality of virtual keys which are expired.

The method may further comprise sending a status report from the vehicle device to be received by the reservation management device, the status report indicating the plurality of virtual keys stored on the first at least one non-transitory processor-readable storage medium. The status report may indicate an expiry time for each virtual key of the plurality of virtual keys, and the method may further comprise: receiving, by the vehicle device, an updated plurality of virtual keys which does not include expired virtual keys; and storing, by the first at least one non-transitory processor-readable storage medium, the updated plurality of virtual keys. The method may further comprise: determining, by a second at least one processor of the reservation management device, whether any virtual keys of the plurality of virtual keys has expired based on the expiry time for each key; updating, by the second at least one processor of the reservation management device, the plurality of keys to remove any expired keys; and providing the updated plurality of keys to the vehicle device. The method may further comprise: receiving, by the vehicle device, an updated plurality of virtual keys which includes at least one additional virtual key not indicated in the status report; and storing, by the first at least one non-transitory processor-readable storage medium, the updated plurality of virtual keys. The method may further comprise: determining, by a second at least one processor of the reservation management device, whether any new virtual key requests have been received since a previous status update was received from the vehicle device; determining, by the second at least one processor, whether there is an available virtual key slot for each new virtual key request; updating, by the second at least one processor, the plurality of virtual keys to add at least one new virtual key corresponding to each new virtual key request in available key slots; and providing the updated plurality of virtual keys to the vehicle device. The method may further comprise: receiving, by the vehicle device, at least one additional virtual key not indicated in the status report; and storing, by the first at least one non-transitory processor-readable storage medium, the at least one additional virtual key. Sending the status report from the vehicle device may comprise sending the status report from the vehicle device at regular intervals.

The indication of vehicle access privileges may indicate that the candidate user has no vehicle access privileges; and providing vehicle access to the candidate user in accordance with the vehicle access privileges indicated in the indication of vehicle access privileges may comprise: denying vehicle access to the candidate user.

According to another broad aspect, the present disclosure describes a system for managing shared access to a vehicle, the system comprising: a vehicle device including a first communication interface, a first at least one processor; and a first at least one non-transitory processor-readable storage medium communicatively coupled to the first at least one processor, wherein the first at least one non-transitory processor-readable storage medium stores first processor-executable instructions, which when executed by the first at least one processor cause the vehicle device to: store, by the first at least one non-transitory processor-readable storage medium, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a candidate user, where credentials for the candidate user are received by the vehicle device, determine by the first at least one processor whether the candidate user is included in a list of the plurality of lists; if the candidate user is included in a list of the plurality of lists: determine, by the first at least one processor, a virtual key associated with the list in which the candidate user is included and a set of vehicle access privileges associated with the determined virtual key; and provide vehicle access to the candidate user in accordance with the determined set of vehicle access privileges; and if the candidate user is not included in a list of the plurality of lists: communicate, by the first communication interface, the credentials of the candidate user for reception by a reservation management device; receive, by the first communication interface from the reservation management device, an indication of vehicle access privileges of the candidate user; and provide vehicle access to the candidate user in accordance with the vehicle access privileges indicated in the received indication of vehicle access privileges.

The indication of vehicle access privileges of the candidate user may comprise: a specified list of at least one user including the candidate user associated with a specified virtual key which is associated with a specified set of vehicle access privileges; and vehicle access may be provided to the candidate user in accordance with the specified set of vehicle access privileges. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: update, by the second at least one processor, an existing list of at least one user associated with an existing virtual key to include the candidate user; and send, by the second communication interface, the updated list of at least one user. The indication of vehicle access privileges of the candidate user may further comprise the specified virtual key. The system may further comprise the reservation management device which includes a second at least one processor, a second at least one non-transitory processor-readable storage medium communicatively coupled to the at least one second processor, and a second communication interface, and the second at least one non-transitory processor-readable storage medium may store second processor-executable instructions, which when executed by the second at least one processor cause the reservation management device to: create, by the second at least one processor, the specified virtual key and the specified list of at least one user associated with the specified virtual key; and send, by the second communication interface, the specified virtual key and the specified list of at least one user to be received by the vehicle device.

The first processor-executable instructions which cause the first at least one non-transitory processor-readable storage medium to store the plurality of virtual keys may cause the first at least one non-transitory processor-readable storage medium to: store the plurality of virtual keys in a plurality of virtual key slots, each virtual key of the plurality of virtual keys stored in a respective virtual key slot of the plurality of virtual key slots. The plurality of virtual key slots may include one active virtual key slot and a plurality of non-active virtual key slots; access to the vehicle may be controlled according to a set of vehicle access privileges associated with a virtual key stored in the active virtual key slot; the first processor-executable instructions which cause the vehicle device to, if the candidate user is included in a list of the plurality of lists, provide vehicle access to the candidate user in accordance with the determined set of vehicle access privileges may cause the first at least one processor-readable storage medium to store the determined virtual key in the active virtual key slot; and the first processor-executable instructions which cause the vehicle device to, if the candidate user is not included in a list of the plurality of lists: provide vehicle access to the candidate user in accordance with the vehicle access privileges provided in the indication of vehicle access privileges may cause the first at least one non-transitory processor-readable storage medium to: store a virtual key associated with the vehicle access privileges provided in the indication of vehicle access privileges in the active virtual key slot.

The first processor-executable instructions which cause the first at least one non-transitory processor-readable storage medium to store the determined virtual key in the active virtual key slot may cause the first at least one non-transitory processor-readable storage medium to copy the determined virtual key to the active virtual key slot. The plurality of non-active virtual key slots may include four non-active-virtual key slots.

Each virtual key of the plurality of virtual keys may be associated with an expiry time, and the first processor-executable instructions may further cause the first at least one non-transitory processor-readable storage medium to: remove keys of the plurality of virtual keys which are expired.

The first processor-executable instructions may further cause the vehicle device to: send, by the first communication interface, a status report from the vehicle device to be received by the reservation management device, the status report indicating the plurality of virtual keys stored on the first at least one non-transitory processor-readable storage medium. The status report may indicate an expiry time for each virtual key of the plurality of virtual keys, and the first processor-executable instructions may further cause the vehicle device to: receive, by the first communication interface, an updated plurality of virtual keys which does not include expired virtual keys; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any virtual keys of the plurality of virtual keys has expired based on the expiry time for each key; update, by the second at least one processor, the plurality of virtual keys to remove any expired keys; and provide, by the second communication interface, the updated plurality of virtual keys to the vehicle device. The first processor-executable instructions may further cause the vehicle device to: receive, by the first communication interface, an updated plurality of virtual keys which includes at least one additional virtual key not indicated in the status report; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any new virtual key requests have been received since a previous status update was received from the vehicle; determine, by the second at least one processor, whether there is an available virtual key slot for each new virtual key request; update, by the second at least one processor, the plurality of virtual keys to add at least one new virtual key corresponding to each new virtual key request in available key slots; and provide, by the second communication interface, the updated plurality of virtual keys to the vehicle device. The first processor-executable instructions may further cause the vehicle device to: receive, by first communication interface, at least one additional virtual key not indicated in the status report; and store, by the first at least one non-transitory processor-readable storage medium, the at least one additional virtual key. The first processor-executable instructions which cause the first communication interface to send the status report may cause the first communication interface to send the status report at regular intervals.

The indication of vehicle access privileges of the candidate user may indicate that the candidate user has no vehicle access privileges; and the first processor-executable instructions which cause the vehicle device to provide vehicle access to the candidate user in accordance with the vehicle access privileges indicated in the indication of vehicle access privileges may cause the vehicle device to: deny vehicle access to the candidate user.

According to another broad aspect, the present disclosure describes a method for managing shared access to a vehicle including a vehicle device, the method comprising: storing, by a first at least one non-transitory processor-readable storage medium of the vehicle device, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a user device of a candidate user, where credentials for the candidate user are received by the vehicle device from the user device, determining by a first at least one processor of the vehicle device, whether the candidate user is included in a list of the plurality of lists; if the candidate user is included in a list of the plurality of lists: determining, by the first at least one processor of the vehicle device, a virtual key associated with the list in which the candidate user is included and a set of vehicle access privileges associated with the determined virtual key; and providing vehicle access to the candidate user in accordance with the determined set of vehicle access privileges; and if the candidate user is not included in a list of the plurality of lists: receiving, from the user device, an indication of vehicle access privileges of the candidate user; and providing vehicle access to the candidate user in accordance with the vehicle access privileges indicated in the received indication of vehicle access privileges.

Receiving an indication of vehicle access privileges of the candidate user may comprise: receiving, by a communication interface of the vehicle device from the user device, a specified list of at least one user including the candidate user associated with a specified virtual key which is associated with a specified set of vehicle access privileges; and providing vehicle access to the candidate user in accordance with the vehicle access privileges provided in the indication of vehicle access privileges may comprise: providing vehicle access to the candidate user in accordance with the specified set of vehicle access privileges. The method may further comprise: downloading, by the user device from a reservation management device, the specified list of at least one user; and sending, by the user device, the specified list of at least one user to be received by the vehicle device. The method may further comprise: updating, by a second at least one processor of the reservation management device, an existing list of at least one user associated with an existing virtual key to include the candidate user; and sending, by a communication interface of the reservation management device, the updated list of at least one user to be received by the user device. The method may further comprise: downloading, by the user device from a reservation management device, the specified virtual key; and sending, by the user device, the specified virtual key to be received by the vehicle device. The method may further comprise: creating, by a second at least one processor of the reservation management device, the specified virtual key and the specified list of at least one user associated with the specified virtual key; and transferring, by a communication interface of the reservation management device, the specified virtual key and the specified list of at least one user to be received by the user device.

Storing the plurality of virtual keys may comprise: storing the plurality of virtual keys in a plurality of virtual key slots on the first at least one non-transitory processor-readable storage medium, each virtual key of the plurality of virtual keys stored in a respective virtual key slot of the plurality of virtual key slots. The plurality of virtual key slots may include one active virtual key slot and a plurality of non-active virtual key slots, access to the vehicle is controlled according to a set of vehicle access privileges associated with a virtual key stored in the active virtual key slot, and the method may further comprise: if the candidate user is included in a list of the plurality of lists: providing vehicle access to the candidate user in accordance with the determined set of vehicle access privileges includes storing the determined virtual key in the active virtual key slot; and if the candidate user is not included in a list of the plurality of lists: providing vehicle access to the candidate user in accordance with the vehicle access privileges provided in the indication of vehicle access privileges may include storing a virtual key associated with the vehicle access privileges provided in the indication of vehicle access privileges in the active virtual key slot. 9 Storing the determined virtual key in the active virtual key slot may comprise copying the determined virtual key to the active virtual key slot. The plurality of non-active virtual key slots may include four non-active-virtual key slots.

Each virtual key of the plurality of virtual keys may be associated with an expiry time, and the method may further comprise: removing, from the first at least one non-transitory processor-readable storage medium, keys of the plurality of virtual keys which are expired.

The method may further comprise sending a status report from the vehicle device to be received by a reservation management device, the status report indicating the plurality of virtual keys stored on the first at least one non-transitory processor-readable storage medium. The status report may indicate an expiry time for each virtual key of the plurality of virtual keys, and the method may further comprise: receiving, by the vehicle device, an updated plurality of virtual keys which does not include expired virtual keys; and storing, by the first at least one non-transitory processor-readable storage medium, the updated plurality of virtual keys. The method may further comprise: determining, by a second at least one processor of the reservation management device, whether any virtual keys of the plurality of virtual keys has expired based on the expiry time for each key; updating, by the second at least one processor of the reservation management device, the plurality of virtual keys to remove any expired keys; and providing the updated plurality of virtual keys to the vehicle device. The method may further comprise: receiving, by the vehicle device, an updated plurality of virtual keys which includes at least one additional virtual key not indicated in the status report; and storing, by the first at least one non-transitory processor-readable storage medium, the updated plurality of virtual keys. The method of may further comprise: determining, by a second at least one processor of the reservation management device, whether any new virtual key requests have been received since a previous status update was received from the vehicle device; determining, by the second at least one processor, whether there is an available virtual key slot for each new virtual key request; updating, by the second at least one processor, the plurality of virtual keys to add at least one new virtual key corresponding to each new virtual key request in available key slots; and providing the updated plurality of virtual keys to the vehicle device. The method may further comprise: receiving, by the vehicle device, at least one additional virtual key not indicated in the status report; and storing, by the first at least one non-transitory processor-readable storage medium, the at least one additional virtual key. Sending the status report from the vehicle device may comprise sending the status report from the vehicle device at regular intervals.

The indication of vehicle access privileges may indicate that the candidate user has no vehicle access privileges; and providing vehicle access to the candidate user in accordance with the vehicle access privileges indicated in the indication of vehicle access privileges may comprise: denying vehicle access to the candidate user.

According to another broad aspect, the present disclosure describes a system for managing shared access to a vehicle, the system comprising: a vehicle device including a first communication interface, a first at least one processor; and a first at least one non-transitory processor-readable storage medium communicatively coupled to the first at least one processor, wherein the first at least one non-transitory processor-readable storage medium stores first processor-executable instructions, which when executed by the first at least one processor cause the vehicle device to: store, by the first at least one non-transitory processor-readable storage medium, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a user device of a candidate user, where credentials for the candidate user are received from the user device, determine by the first at least one processor whether the candidate user is included in a list of the plurality of lists; if the candidate user is included in a list of the plurality of lists: determine, by the first at least one processor, a virtual key associated with the list in which the candidate user is included and a set of vehicle access privileges associated with the determined virtual key; and provide vehicle access to the candidate user in accordance with the determined set of vehicle access privileges; and if the candidate user is not included in a list of the plurality of lists: receive, by the first communication interface from the user device, an indication of vehicle access privileges of the candidate user; and provide vehicle access to the candidate user in accordance with the vehicle access privileges indicated in the received indication of vehicle access privileges.

The indication of vehicle access privileges of the candidate user may comprise: a specified list of at least one user including the candidate user associated with a specified virtual key which is associated with a specified set of vehicle access privileges; and vehicle access may be provided to the candidate user in accordance with the specified set of vehicle access privileges. The system may further comprise the user device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the user device to: download, by the second communication interface from a reservation management device, the specified list of at least one user; and send, by the second communication interface, the specified list of at least one user to be received by the vehicle device. The system may further comprise the reservation management device which includes a third at least one processor, a third at least one non-transitory processor-readable storage medium communicatively coupled to the third at least one processor, and a third communication interface, and the third at least one non-transitory processor-readable storage medium may store third processor-executable instructions, which when executed by the third at least one processor cause the reservation management device to: update, by the third at least one processor, an existing list of at least one user associated with an existing virtual key to include the candidate user; and send, by the third communication interface, the updated list of at least one user to be received by the user device. The second processor-executable instructions may further cause the user device to: download, by the second communication interface from a reservation management device, the specified virtual key; and send, by the second communication interface, the specified virtual key to be received by the vehicle device. The system may further comprise the reservation management device which includes a third at least one processor, a third at least one non-transitory processor-readable storage medium communicatively coupled to the third at least one processor, and a third communication interface, and the third at least one non-transitory processor-readable storage medium may store third processor-executable instructions, which when executed by the third at least one processor cause the reservation management device to: create, by the third at least one processor, the specified virtual key and the list of at least one user associated with the specified virtual key; and transfer, by the third communication interface, the specified virtual key and the specified list of at least one user to be received by the user device.

The first processor-executable instructions which cause the first at least one non-transitory processor-readable storage medium to store the plurality of virtual keys may cause the first at least one non-transitory processor-readable storage medium to: store the plurality of virtual keys in a plurality of virtual key slots, each virtual key of the plurality of virtual keys stored in a respective virtual key slot of the plurality of virtual key slots. The plurality of virtual key slots may include one active virtual key slot and a plurality of non-active virtual key slots; access to the vehicle may be controlled according to a set of vehicle access privileges associated with a virtual key stored in the active virtual key slot; the first processor-executable instructions which cause the vehicle device to, if the candidate user is included in a list of the plurality of lists, provide vehicle access to the candidate user in accordance with the determined set of vehicle access privileges may cause the first at least one non-transitory processor-readable storage medium to store the determined virtual key in the active virtual key slot; and the first processor-executable instructions which cause the vehicle device to, if the candidate user is not included in a list of the plurality of lists: provide vehicle access to the candidate user in accordance with the vehicle access privileges indicated in the indication of vehicle access privileges may cause the first at least one non-transitory processor-readable storage medium to: store a virtual key associated with the vehicle access privileges provided in the indication of vehicle access privileges in the active virtual key slot. The first processor-executable instructions which cause the first at least one non-transitory processor-readable storage medium to store the determined virtual key in the active virtual key slot may cause the first at least one non-transitory processor-readable storage medium to copy the determined virtual key to the active virtual key slot. The plurality of non-active virtual key slots may include four non-active-virtual key slots.

Each virtual key of the plurality of virtual keys may be associated with an expiry time, and the first processor-executable instructions may further cause the first at least one non-transitory processor-readable storage medium to: remove keys of the plurality of virtual keys which are expired.

The first processor-executable instructions may further cause the vehicle device to: send, by the first communication interface, a status report from the vehicle device to be received by a reservation management device, the status report indicating the plurality of virtual keys stored on the first at least one non-transitory processor-readable storage medium. The status report may indicate an expiry time for each virtual key of the plurality of virtual keys, and the first processor-executable instructions may further cause the vehicle device to: receive, by the first communication interface, an updated plurality of virtual keys which does not include expired virtual keys; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any virtual keys of the plurality of virtual keys has expired based on the expiry time for each key; update, by the second at least one processor, the plurality of virtual keys to remove any expired keys; and provide, by the second communication interface, the updated plurality of virtual keys to the vehicle device.

The first processor-executable instructions may further cause the vehicle device to: receive, by the first communication interface, an updated plurality of virtual keys which includes at least one additional virtual key not indicated in the status report; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any new virtual key requests have been received since a previous status update was received from the vehicle; determine, by the second at least one processor, whether there is an available virtual key slot for each new virtual key request; update, by the second at least one processor, the plurality of virtual keys to add at least one new virtual key corresponding to each new virtual key request in available key slots; and provide, by the second communication interface, the updated plurality of virtual keys to the vehicle device. The first processor-executable instructions may further cause the vehicle device to: receive, by first communication interface, at least one additional virtual key not indicated in the status report; and store, by the first at least one non-transitory processor-readable storage medium, the at least one additional virtual key. The first processor-executable instructions which cause the first communication interface to send the status report may cause the first communication interface to send the status report at regular intervals.

The indication of vehicle access privileges of the candidate user may indicate that the candidate user has no vehicle access privileges; and the first processor-executable instructions which cause the vehicle device to provide vehicle access to the candidate user in accordance with the vehicle access privileges indicated in the indication of vehicle access privileges may cause the vehicle device to: deny vehicle access to the candidate user.

According to another broad aspect, the present disclosure describes a method for managing shared access to a vehicle including a vehicle device, the method comprising: storing, by a first at least one non-transitory processor-readable storage medium of the vehicle device, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a candidate user, where credentials for the candidate user are received by the vehicle device, determining by a first at least one processor of the vehicle device, whether the candidate user is included in a list of the plurality of lists; if the candidate user is included in a list of the plurality of lists: determining, by the first at least one processor of the vehicle device, a virtual key associated with the list in which the candidate user is included and a set of vehicle access privileges associated with the determined virtual key; and providing vehicle access to the candidate user in accordance with the determined set of vehicle access privileges; and if the candidate user is not included in a list of the plurality of lists: receiving input from the candidate user which includes an indication of vehicle access privileges of the candidate user; and providing vehicle access to the candidate user in accordance with the vehicle access privileges indicated in the indication of vehicle access privileges.

Receiving input from the candidate user which includes an indication of vehicle access privileges of the candidate user may comprise: receiving input from the candidate user which identifies a specified virtual key stored on the first at least one non-transitory processor-readable storage medium, the specified virtual key associated with a specified set of vehicle access privileges; and providing vehicle access to the candidate user in accordance with the vehicle access privileges provided in the indication of vehicle access privileges may comprise: providing vehicle access to the candidate user in accordance with the specified set of vehicle access privileges. The method may further comprise: updating, by the first at least one processor, an existing list of at least one user stored on the first at least one non-transitory processor-readable storage medium associated with the specified virtual key to include the candidate user.

Receiving input from the candidate user which includes an indication of vehicle access privileges of the candidate user may comprises: receiving input from the candidate user which includes a new virtual key associated with a specified set of vehicle access privileges; and providing vehicle access to the candidate user in accordance with the vehicle access privileges provided in the indication of vehicle access privileges may comprise: providing vehicle access to the candidate user in accordance with the specified set of vehicle access privileges. The method may further comprise, if the candidate user is not included in a list of the plurality of lists: storing, by the first at least one non-transitory processor-readable storage medium, the new virtual key and a new list of at least one user associated with the new virtual key which includes the candidate user.

The method may further comprise, if the candidate user is not included in a list of the plurality of lists: creating, by the first at least one processor, a new virtual key associated with a specified set of vehicle access privileges; and creating, by the first at least one processor, a new list of at least one user associated with the new virtual key which includes the candidate user, and providing vehicle access to the candidate user in accordance with the vehicle access privileges provided in the indication of vehicle access privileges may comprise: providing vehicle access to the candidate user in accordance with the specified set of vehicle access privileges.

Storing the plurality of virtual keys may comprise: storing the plurality of virtual keys in a plurality of virtual key slots on the first at least one non-transitory processor-readable storage medium, each virtual key of the plurality of virtual keys stored in a respective virtual key slot of the plurality of virtual key slots. The plurality of virtual key slots may include one active virtual key slot and a plurality of non-active virtual key slots, access to the vehicle may be controlled according to a set of vehicle access privileges associated with a virtual key stored in the active virtual key slot, and the method may further comprise: if the candidate user is included in a list of the plurality of lists: providing vehicle access to the candidate user in accordance with the determined set of vehicle access privileges includes storing the determined virtual key in the active virtual key slot; and if the candidate user is not included in a list of the plurality of lists: providing vehicle access to the candidate user in accordance with the vehicle access privileges provided in the indication of vehicle access privileges may include storing a virtual key associated with the vehicle access privileges provided in the indication of vehicle access privileges in the active virtual key slot. Storing the determined virtual key in the active virtual key slot may comprise copying the determined virtual key to the active virtual key slot. The plurality of non-active virtual key slots may include four non-active-virtual key slots.

Each virtual key of the plurality of virtual keys may be associated with an expiry time, and the method may further comprise: removing, from the first at least one non-transitory processor-readable storage medium, keys of the plurality of virtual keys which are expired.

The method may further comprise sending a status report from the vehicle device to be received by a reservation management device, the status report indicating the plurality of virtual keys stored on the first at least one non-transitory processor-readable storage medium. The status report may indicate an expiry time for each virtual key of the plurality of virtual keys, and the method may further comprise: receiving, by the vehicle device, an updated plurality of virtual keys which does not include expired virtual keys; and storing, by the first at least one non-transitory processor-readable storage medium, the updated plurality of virtual keys. The method may further comprise: determining, by a second at least one processor of the reservation management device, whether any virtual keys of the plurality of virtual keys has expired based on the expiry time for each key; updating, by the second at least one processor of the reservation management device, the plurality of virtual keys to remove any expired keys; and providing the updated plurality of virtual keys to the vehicle device. The method may further comprise: receiving, by the vehicle device, an updated plurality of virtual keys which includes at least one additional virtual key not indicated in the status report; and storing, by the first at least one non-transitory processor-readable storage medium, the updated plurality of virtual keys. The method may further comprise: determining, by a second at least one processor of the reservation management device, whether any new virtual key requests have been received since a previous status update was received from the vehicle device; determining, by the second at least one processor, whether there is an available virtual key slot for each new virtual key request; updating, by the second at least one processor, the plurality of virtual keys to add at least one new virtual key corresponding to each new virtual key request in available key slots; and providing the updated plurality of virtual keys to the vehicle device. The method may further comprise: receiving, by the vehicle device, at least one additional virtual key not indicated in the status report; and storing, by the first at least one non-transitory processor-readable storage medium, the at least one additional virtual key. Sending the status report from the vehicle device may comprise sending the status report from the vehicle device at regular intervals.

The indication of vehicle access privileges may indicate that the candidate user has no vehicle access privileges; and providing vehicle access to the candidate user in accordance with the vehicle access privileges indicated in the indication of vehicle access privileges may comprise: denying vehicle access to the candidate user.

Receiving input from the candidate user which includes an indication of vehicle access privileges of the candidate user may comprise: receiving the input from the candidate user by a user input device of the vehicle. Receiving input from the candidate user which includes an indication of vehicle access privileges of the candidate user may comprise: receiving the input from the candidate user from a user device by a communication interface of the vehicle device.

According to another broad aspect, the present disclosure describes a system for managing shared access to a vehicle, the system comprising: a vehicle device including a first communication interface, a first at least one processor; and a first at least one non-transitory processor-readable storage medium communicatively coupled to the first at least one processor, wherein the first at least one non-transitory processor-readable storage medium stores first processor-executable instructions, which when executed by the first at least one processor cause the vehicle device to: store, by the first at least one non-transitory processor-readable storage medium, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated; in response to an interaction event with the vehicle device by a candidate user, where credentials for the candidate user are received by the vehicle device, determine by the first at least one processor whether the candidate user is included in a list of the plurality of lists; if the candidate user is included in a list of the plurality of lists: determine, by the first at least one processor, a virtual key associated with the list in which the candidate user is included and a set of vehicle access privileges associated with the determined virtual key; and provide vehicle access to the candidate user in accordance with the determined set of vehicle access privileges; and if the candidate user is not included in a list of the plurality of lists: receive input from the candidate user which includes an indication of vehicle access privileges of the candidate user; and provide vehicle access to the candidate user in accordance with the vehicle access privileges indicated in the indication of vehicle access privileges.

The input from the candidate user which includes the indication of vehicle access privileges of the candidate user may comprise: input from the candidate user which identifies a specified virtual key stored on the first at least one non-transitory processor-readable storage medium, the specified virtual key associated with a specified set of vehicle access privileges; and vehicle access may be provided to the candidate user in accordance with the specified set of vehicle access privileges. The first processor-executable instructions may further cause the first at least one processor to: update an existing list of at least one user stored on the first at least one non-transitory processor-readable storage medium associated with the specified virtual key to include the candidate user. The input from the candidate user which includes an indication of vehicle access privileges of the candidate user may comprise: input from the candidate user which includes a new virtual key associated with a specified set of vehicle access privileges; and the first processor-executable instructions which cause the vehicle device to provide vehicle access to the candidate user in accordance with the vehicle access privileges indicated in the indication of vehicle access privileges may cause the vehicle device to: provide vehicle access to the candidate user in accordance with the specified set of vehicle access privileges. The first processor-executable instructions may further cause the vehicle device to, if the candidate user is not included in a list of the plurality of lists: store, by the first at least one non-transitory processor-readable storage medium, the new virtual key and a new list of at least one user associated with the new virtual key which includes the candidate user.

The first processor-executable instructions may further cause the vehicle device to, if the candidate user is not included in a list of the plurality of lists: create, by the first at least one processor, a new virtual key associated with a specified set of vehicle access privileges; and create, by the first at least one processor, a new list of at least one user associated with the new virtual key which includes the candidate user, and the first processor-executable instructions which cause the vehicle device to provide vehicle access to the candidate user in accordance with the vehicle access privileges provided in the indication of vehicle access privileges may cause the vehicle device to: provide vehicle access to the candidate user in accordance with the specified set of vehicle access privileges.

The first processor-executable instructions which cause the first at least one non-transitory processor-readable storage medium to store the plurality of virtual keys may cause the first at least one non-transitory processor-readable storage medium to: store the plurality of virtual keys in a plurality of virtual key slots, each virtual key of the plurality of virtual keys stored in a respective virtual key slot of the plurality of virtual key slots. The plurality of virtual key slots may include one active virtual key slot and a plurality of non-active virtual key slots; access to the vehicle may be controlled according to a set of vehicle access privileges associated with a virtual key stored in the active virtual key slot; the first processor-executable instructions which cause the vehicle device to, if the candidate user is included in a list of the plurality of lists, provide vehicle access to the candidate user in accordance with the determined set of vehicle access privileges may cause the first at least one non-transitory processor-readable storage medium to store the determined virtual key in the active virtual key slot; and the first processor-executable instructions which cause the vehicle device to, if the candidate user is not included in a list of the plurality of lists: provide vehicle access to the candidate user in accordance with the vehicle access privileges provided in the indication of vehicle access privileges may cause the first at least one non-transitory processor-readable storage medium to: store a virtual key associated with the vehicle access privileges provided in the indication of vehicle access privileges in the active virtual key slot. The first processor-executable instructions which cause the first at least one non-transitory processor-readable storage medium to store the determined virtual key in the active virtual key slot may cause the first at least one non-transitory processor-readable storage medium to copy the determined virtual key to the active virtual key slot. The plurality of non-active virtual key slots may include four non-active-virtual key slots.

Each virtual key of the plurality of virtual keys may be associated with an expiry time, and the first processor-executable instructions may further cause the first at least one non-transitory processor-readable storage medium to: remove keys of the plurality of virtual keys which are expired.

The first processor-executable instructions may further cause the vehicle device to: send, by the first communication interface, a status report from the vehicle device to be received by a reservation management device, the status report indicating the plurality of virtual keys stored on the first at least one non-transitory processor-readable storage medium. The status report may indicate an expiry time for each virtual key of the plurality of virtual keys, and the first processor-executable instructions may further cause the vehicle device to: receive, by the first communication interface, an updated plurality of virtual keys which does not include expired virtual keys; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any virtual keys of the plurality of virtual keys has expired based on the expiry time for each key; update, by the second at least one processor, the plurality of virtual keys to remove any expired virtual keys; and provide, by the second communication interface, the updated plurality of virtual keys to the vehicle device. The first processor-executable instructions may further cause the vehicle device to: receive, by the first communication interface, an updated plurality of virtual keys which includes at least one additional virtual key not indicated in the status report; and store, by the first at least one non-transitory processor-readable storage medium, the updated plurality of virtual keys. The system may further comprise the reservation management device which includes a second at least one processor, a second at least one non-transitory processor-readable storage medium communicatively coupled to the second at least one processor, and a second communication interface, and the second at least one non-transitory processor-readable storage medium may store second processor-executable instructions, which when executed by the second at least one processor cause the reservation management device to: determine, by the second at least one processor, whether any new virtual key requests have been received since a previous status update was received from the vehicle; determine, by the second at least one processor, whether there is an available virtual key slot for each new virtual key request; update, by the second at least one processor, the plurality of virtual keys to add at least one new virtual key corresponding to each new virtual key request in available key slots; and provide, by the second communication interface, the updated plurality of virtual keys to the vehicle device. The first processor-executable instructions may further cause the vehicle device to: receive, by first communication interface, at least one additional virtual key not indicated in the status report; and store, by the first at least one non-transitory processor-readable storage medium, the at least one additional virtual key. The first processor-executable instructions which cause the first communication interface to send the status report may cause the first communication interface to send the status report at regular intervals.

The indication of vehicle access privileges of the candidate user may indicate that the candidate user has no vehicle access privileges; and the first processor-executable instructions which cause the vehicle device to provide vehicle access to the candidate user in accordance with the vehicle access privileges indicated in the indication of vehicle access privileges may cause the vehicle device to: deny vehicle access to the candidate user.

BRIEF DESCRIPTION OF THE DRAWINGS

Exemplary non-limiting embodiments are described with reference to the accompanying drawings in which.

DETAILED DESCRIPTION

The present disclosure details systems, methods, and devices for managing access to shared vehicles.

Figure 1:
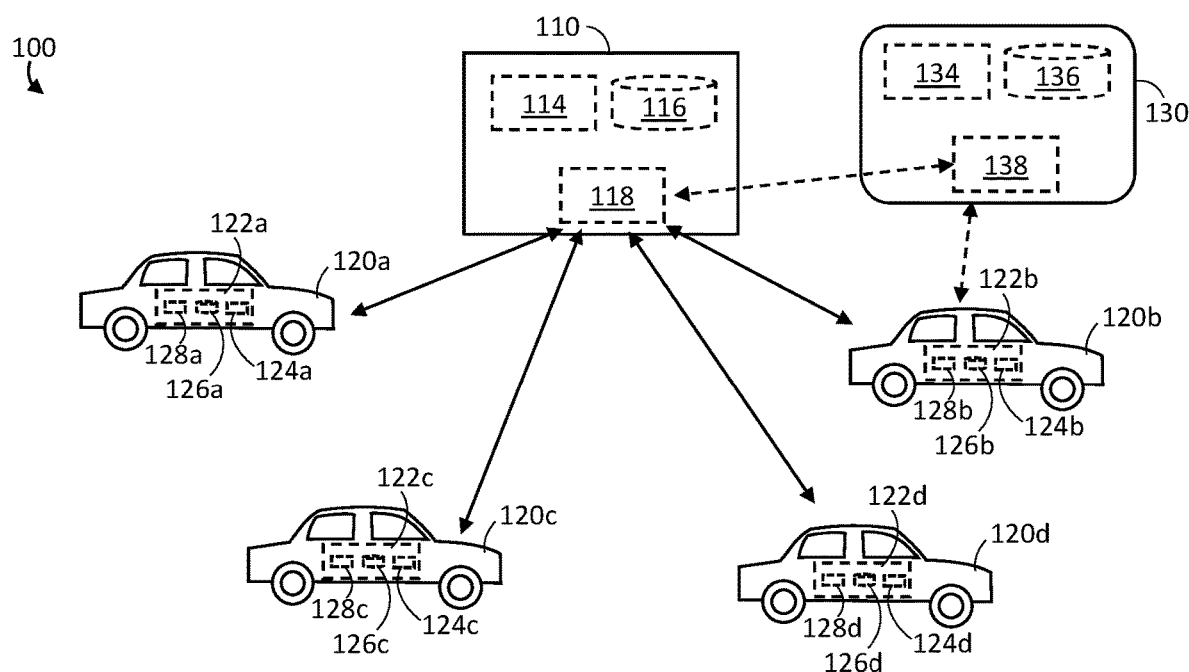
FIG. 1 is a schematic view of a system for managing shared vehicle access.

FIG. 1 is a schematic view of a system 100 for managing shared vehicle access. FIG. 1 shows a reservation management device 110, which includes at least one processor 114, at least one non-transitory processor-readable storage medium 116, and a communication interface 118. Although illustrated as one device, reservation management device 110 can include a plurality of devices, a plurality of processors 114, a plurality of non-transitory processor-readable storage mediums 116, and/or a plurality of communication interfaces 118. Further, such a plurality of reservation management devices can be in close proximity (e.g. in a central server location), or can be distributed across different locations (e.g. as remote devices). Communication interface 118 can be a wired or wireless interface, through which reservation management device 110 communicates with other devices, such as a plurality of vehicles, vehicle devices, or user devices.

In the illustrated example, reservation management device 110 is shown as communicating with vehicle devices in four vehicles 120a, 120b, 120c, and 120d (collectively referred to as vehicles 120). However, reservation management device 110 could communicate with vehicle devices in any appropriate number of vehicles, such as one vehicle, dozens of vehicles, hundreds of vehicles, thousands of vehicles, or even more vehicles.

Vehicle 120a includes at least one processor 124a, at least one non-transitory processor-readable storage medium 126a, and a communication interface 128a. Together, the at least one processor 124a, the at least one non-transitory processor-readable storage medium 126a, and the communication interface 128a can be referred to as "vehicle device" 122a.

Vehicle 120b includes at least one processor 124b, at least one non-transitory processor-readable storage medium 126b, and a communication interface 128b. Together, the at least one processor 124b, the at least one non-transitory processor-readable storage medium 126b, and the communication interface 128b can be referred to as "vehicle device" 122b.

Vehicle 120c includes at least one processor 124c, at least one non-transitory processor-readable storage medium 126c, and a communication interface 128c. Together, the at least one processor 124c, the at least one non-transitory processor-readable storage medium 126c, and the communication interface 128c can be referred to as "vehicle device" 122c.

Vehicle 120d includes at least one processor 124d, at least one non-transitory processor-readable storage medium 126d, and a communication interface 128d. Together, the at least one processor 124d, the at least one non-transitory processor-readable storage medium 126d, and the communication interface 128d can be referred to as "vehicle device" 122d.

Collectively, vehicle 120a, vehicle 120b, vehicle 120c, and vehicle 120d can be referred to as "vehicles 120". Collectively, the at least one processor 124a, the at least one processor 124b, the at least one processor 124c, and the at least one processor 124d can be referred to as "processors 124". Collectively, the at least one non-transitory processor-readable storage medium 126a, the at least one non-transitory processor-readable storage medium 126b, the at least one non-transitory processor-readable storage medium 126c, and the at least one non-transitory processor-readable storage medium 126d can be referred to as "non-transitory processor-readable storage mediums 126". Collectively, communication interface 128a, communication interface 128b, communication interface 128c, and communication interface 128d can be referred to as "communication interfaces 128". Collectively, vehicle device 122a, vehicle device 122b, vehicle device 122c, and vehicle device 122d can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. However, this is not necessarily the case, and each vehicle device 122 can refer to the collection of components installed in a vehicle (i.e. they do not have to be packaged in a single housing). Further, components of any of the vehicle devices 122 can be multi-purpose components which serve other functions within the vehicle.

System 100 is also illustrated in FIG. 1 as including an optional user device 130. User device 130 can further optionally include any of at least one processor 134, at least one non-transitory processor-readable storage medium 136, and a communication interface 138. As one example, user device 130 could be a personal device belonging to a user, such as a smartphone, PDA, tablet, or any similar device. As another example, user device 130 could be an identification device such as an RFID card, key fob, or similar. In some implementations, user device 130 communicates with a vehicle device 122 (e.g. via communication interface 138). In FIG. 1, user device 130 is shown as communicating with vehicle device 122b in vehicle 120b, but user device 130 could also communicate with any of vehicle devices 122a, 122c, or 122d in respective vehicles 120a, 120c, and 120d, or any other vehicle device, as appropriate for a given application. In some implementations, user device 130 communicates with reservation management device 110 (e.g. via communication interfaces 118 and 138) as illustrated in FIG. 1. In some implementations, user device 130 communicates with a vehicle device and with reservation management device 110.

Figure 2:
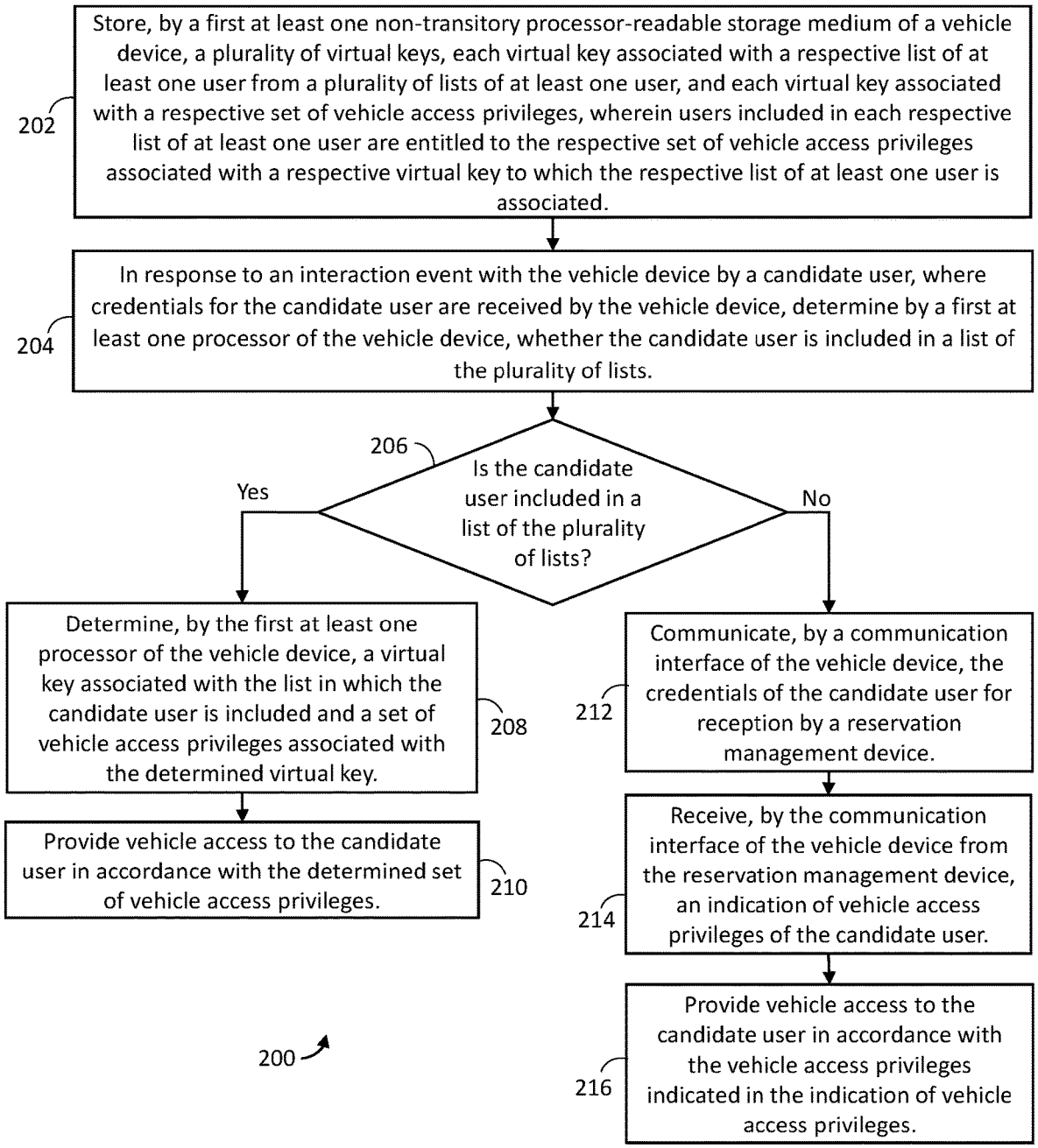
FIGS. 2, 3, and 4 are flowchart diagrams of exemplary methods for managing shared access to a vehicle, in accordance with at least three exemplary illustrated implementations.

FIG. 2 is a flowchart diagram which illustrates an exemplary method 200 performed by devices such as those in FIG. 1. Method 200 as illustrated includes acts 202, 204, 206, 208, 210, 212, 214, and 216. One skilled in the art will appreciate that additional acts could be added, acts could be removed, or acts could be reordered as appropriate for a given application. With reference to the example illustrated in FIG. 1, acts can be performed by appropriate components of reservation management device 110, vehicle devices 122, or user device 130. Further, any of the at least one non-transitory processor-readable storage mediums 116, 126, or 136 could have instructions stored thereon, which when executed by a respective at least one processor (processors 114, 124, or 134) cause the respective reservation management device 110, vehicle devices 122, or user device 130 to perform a given act of method 200. In the discussion of method 200 below, reference to an act being performed by at least one processor 124 refers to the act being performed by any of processors 124a, 124b, 124c, or 124d. Reference to an act being performed by at least one non-transitory processor-readable storage medium 126 refers to the act being performed by any of non-transitory processor-readable storage mediums 126a, 126b, 126c, or 126d. Reference to an act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device).

At 202, a first at least one non-transitory processor-readable storage medium of a vehicle device (e.g. any of non-transitory processor-readable storage mediums 126a, 126b, 126c, or 126d of respective vehicle devices 122a, 122b, 122c, and 122d) stores a plurality of virtual keys. Each virtual key of the plurality of virtual keys is associated with a respective list of at least one user, and each virtual key of the plurality of virtual keys is associated with a respective set of vehicle access privileges. Users included in each respective list of at least one user are entitled to the respective set of vehicle access privileges associated with the respective virtual key to which the respective list of at least one user is associated.

Throughout this disclosure, a given vehicle can be "reserved", in that a "reservation" can be made for the vehicle, in which a certain user can be provided vehicle access. For example, for a rental vehicle fleet, users can reserve vehicles for current or future use. Each reservation can be associated with a virtual key, which can impact whether other users can access the vehicle during reservation periods, or what vehicle access privileges are required by other users in order to override an existing reservation (e.g. administrator privileges). Reservations can be made by users themselves (e.g. for a rental vehicle fleet), or by managers (e.g. for a commercial fleet where users are assigned different vehicles). A pre-existing reservation is not necessarily required for vehicle access. For example, a candidate user may be provided with vehicle access if a vehicle is available. As another example, an service person may be provided with vehicle access as needed for service as needed.

A "set of vehicle access privileges" refers to a set of vehicle related activities a user can perform with respect to a vehicle, and can be assigned on a per-user or per-role of a user basis. As one example, a set of vehicle access privileges for users in a "cleaning staff" role could include permission to unlock and open vehicle doors, but may not include permission to activate an engine of the vehicle or drive the vehicle. As another example, a set of vehicle access privileges for a renter of a vehicle can include permission to unlock and open vehicle doors, to start a vehicle engine, and to drive the vehicle, but may not include permissions to open a hood of the vehicle to access the engine, or to access diagnostic information of the vehicle. As yet another example, a set of vehicle access privileges for a maintenance person can include permission to unlock and open vehicle doors, to start a vehicle engine, to drive the vehicle, to open a hood of the vehicle to access the engine, and to access diagnostic information of the vehicle.

By associating sets of vehicle access privileges with respective virtual keys, which in turn are associated with respective lists of at least one user, multiple users can be assigned to a single virtual key and have the same vehicle access privileges, which improves storage efficiency and management of user permissions. However, it is not required that each unique virtual key be associated with a unique set of vehicle access privileges. For example, in some implementations, two different vehicle renters can be associated with two different virtual keys, where each key is associated with an identical set of vehicle access privileges. In this case, the two different virtual keys are used to manage different vehicle reservations by the different renters (for example for reservations at different times).

An interaction event can occur with the vehicle device by a candidate user. In one example, the interaction event could include the candidate user touching an RFID or NFC user device to a corresponding scanner installed in the vehicle. In another example, the interaction event could include the candidate user using a communications device (e.g. short range communication such as Bluetooth®) to connect to the vehicle device and send signals or data to the vehicle device. In yet another example, the vehicle could have an input device installed, such as a keypad, touchpad, or biometric scanner, which the candidate user can interact with. Credentials for the candidate user (e.g. name, identification code, password, access privileges, authentication key, or other appropriate credentials) are provided to the vehicle device.

At 204, in response to the interaction event, a first at least one processor of the vehicle device (e.g. any of processors 126a, 126b, 126c, or 126d of respective vehicle devices 122a, 122b, 122c, and 122d) determines whether the candidate user is included in a list of the plurality of lists. For example, the first at least one processor can compare credentials for the candidate user to credentials for each user in each list of at least one user (or compare credentials until the candidate user is found in one of the lists of at least one user). At 206, if the candidate user is included in a list of the plurality of lists, method 200 proceeds to acts 208 and 210. At 206, if the candidate user is not included in a list of the plurality of lists, method 200 proceeds to acts 212, 214, and 216.

If the candidate user is included in a list of the plurality of lists at 206, then at 208, the first at least one processor determines a virtual key associated with the list in which the candidate user is included, and a set of vehicle access privileges associated with the determined virtual key. In this way, a set of vehicle access privileges associated with the candidate user is determined. At 210, vehicle access is provided to the candidate user in accordance with the determined set of access privileges.

Throughout this disclosure, there are discussions of providing vehicle access in accordance with sets of vehicle access privileges. In any such discussions herein, vehicle access can be provided in any appropriate manner. As one non-limiting example, a physical key-box can be installed or stored in the vehicle, which contains a physical key for the vehicle (e.g. an ignition key). In some implementations, this key-box can be unlocked to provide a user access to the physical key. Further, this key-box could include means for controlling locking and unlocking doors of the vehicle, such as mechanical actuators which press unlock and lock buttons on a remote associated with the vehicle. In other implementations, the key-box could store a key-fob for a push-to-start vehicle, and can provide power to the key-fob as needed to provide vehicle access. In another non-limiting example, at least one inhibiting module could be installed in the vehicle, which prevents activation (or locking/unlocking) of certain vehicle components absent an authorization signal. Such an inhibiting module could be as described, for example, in U.S. Provisional Patent Application No. 63/227,375, which is incorporated herein by reference in its entirety. These mechanisms for providing or denying vehicle access are merely exemplary, and any mechanism for controlling vehicle access could be utilized as appropriate for a given application. Further, any mechanism for controlling vehicle access can be controlled as instructed by a respective vehicle device (e.g. vehicle devices 122*a*, 122*b*, 122*c*, and 122*d*), or at least one processor in the respective vehicle device (e.g. any of processors 126*a*, 126*b*, 126*c*, or 126*d*).

If the candidate user is not included in a list of the plurality of lists at 206, then at 212, a communication interface of the vehicle device (e.g. any of communication interfaces 128*a*, 128*b*, 128*c*, or 128*d* of respective vehicle devices 122*a*, 122*b*, 122*c*, and 122*d*) communicates the credentials of the candidate user for reception by a reservation management device (e.g. reservation management device 110).

At 214, the communication device of the vehicle device receives, from the reservation management device, an indication of vehicle access privileges of the candidate user. Examples of how the reservation management device obtains or determines the indication of vehicle access privileges are discussed later. Further, several examples of the identification of vehicle access privileges are discussed later.

At 216, vehicle access is provided to the candidate user in accordance with the vehicle access privileges indicated in the indication of vehicle access privileges. Providing vehicle access to the candidate user is similar to as discussed above regarding act 210, and discussion of act 210 is applicable to act 216 unless context requires otherwise.

In some implementations, receiving an indication of vehicle access privileges of the candidate user, as in act 214, comprises: receiving, by the communication interface of the vehicle device from the reservation management device, a specified list of at least one user including the candidate user associated with a specified set of vehicle access privileges. In this exemplary implementation, the candidate user is not found in a list of at least one user at the vehicle device (at 204 and 206), and so the credentials are sent to the reservation management device (at 212), for use as discussed below.

In one exemplary implementation, a second at least one processor of the reservation management device (e.g. the at least one processor 114 of reservation management device 110) can check to see if the candidate user is included in a list of at least one user stored at the reservation management device (e.g. on the at least one non-transitory processor-readable storage medium 116). This could occur, in one example, if a reservation was made for the vehicle via the reservation management device, but hasn't yet been transmitted to the vehicle device. In another example, if the vehicle device has limited storage capacity, not all possible reservations, lists of users, or virtual keys may be stored on the vehicle device, but some can instead be stored on the reservation management device. These scenarios are merely exemplary, and other scenarios may arise where the candidate user is included in a list of at least one user on the non-transitory processor-readable medium of the reservation management device. If a list of users which includes the candidate user is found on the at least one non-transitory processor-readable storage medium of the reservation management device, this (specified) list of at least one user is sent by a communication interface of the reservation management device (e.g. communication interface 118). The specified list is associated with a specified virtual key, which is associated with a specified set of vehicle access privileges. In this way, the "indication of vehicle privileges of the candidate user" comprises the specified list of at least one user. The specified list of at least one user is received by the communication interface of the vehicle device (e.g. any of communication interfaces 128 of respective vehicle device 122), and at 216 vehicle access is provided to the candidate user in accordance with the specified vehicle access privileges.

In some cases, the candidate user may not be included in a list of at least one user stored on the non-transitory processor-readable storage medium of the reservation management device. However, the credentials of the candidate user may be indicative of the user being entitled to vehicle access privileges. For example, in a rental vehicle fleet, the candidate user could be a registered user in good standing, who is able to access available vehicles as needed by interacting with said vehicles. As another example, the candidate user could be a fleet administrator or service worker, who is given vehicle access for the purpose of managing or servicing vehicles in the fleet. These scenarios are merely exemplary, and a candidate user could be deemed as being entitled to vehicle access privileges for any reason appropriate for a given application.

In some cases where the candidate user is entitled to vehicle access privileges, an existing list of at least one user associated with an existing virtual key (associated with an existing set of vehicle access privileges) can be updated by at least one processor of the reservation management device (e.g. the at least one processor 114) to include the candidate user. The updated list of at least one user is then sent by the communication interface (e.g. communication interface 118) of the reservation management device to the vehicle device. The updated list is received by the communication interface of the vehicle device (e.g. any of communication interfaces 128 of respective vehicle device 122), and at 216 vehicle access is provided to the candidate user in accordance with a set of vehicle access privileges associated with a virtual key associated with the updated list.

In other cases where the candidate user is entitled to vehicle access privileges, the at least one processor of the reservation management device can create a new (specified) virtual key, and a specified list of at least one user associated with the specified virtual key which includes the candidate user. The new specified virtual key is associated with a specified set of vehicle access privileges. The new specified virtual key and the specified list of at least one user are sent by the communication interface (e.g. communication interface 118) of the reservation management device to the vehicle device. The specified virtual key and the specified list of at least one user is received by the communication interface of the vehicle device (e.g. any of communication interfaces 128 of respective vehicle device 122), and at 216 vehicle access is provided to the candidate user in accordance with the set of vehicle access privileges associated with the specified virtual key associated with the specified list of at least one user. In some cases, only the new specified virtual key may need to be sent to the vehicle device, and not the list of at least one user associated with the new specified virtual key. As one example, if the candidate user is the only user associated with the new specified virtual key, the at least one processor of the vehicle device could create the list of at least one user (the list of the candidate user) in response to receiving the new specified virtual key, since the vehicle device received credentials of the candidate user in the interaction event with the vehicle device.

In some implementations, the indication of vehicle access privileges in act 214 of method 200 indicates that the candidate user has no vehicle access privileges, in which case providing vehicle access to the candidate user in accordance with the vehicle access privileges indicated in the indication of vehicle access privileges comprises: denying vehicle access to the candidate user. As one example, the candidate user may not be a registered user of a vehicle fleet, and therefore may not be entitled to vehicle access privileges. As another example, the candidate user may be a registered user of a vehicle fleet, but a vehicle device with which they have interacted corresponds to a vehicle which is not available (e.g. is reserved for another user), and therefore the candidate user may not be entitled to vehicle access privileges for said vehicle at the time of interest.

Figure 3:
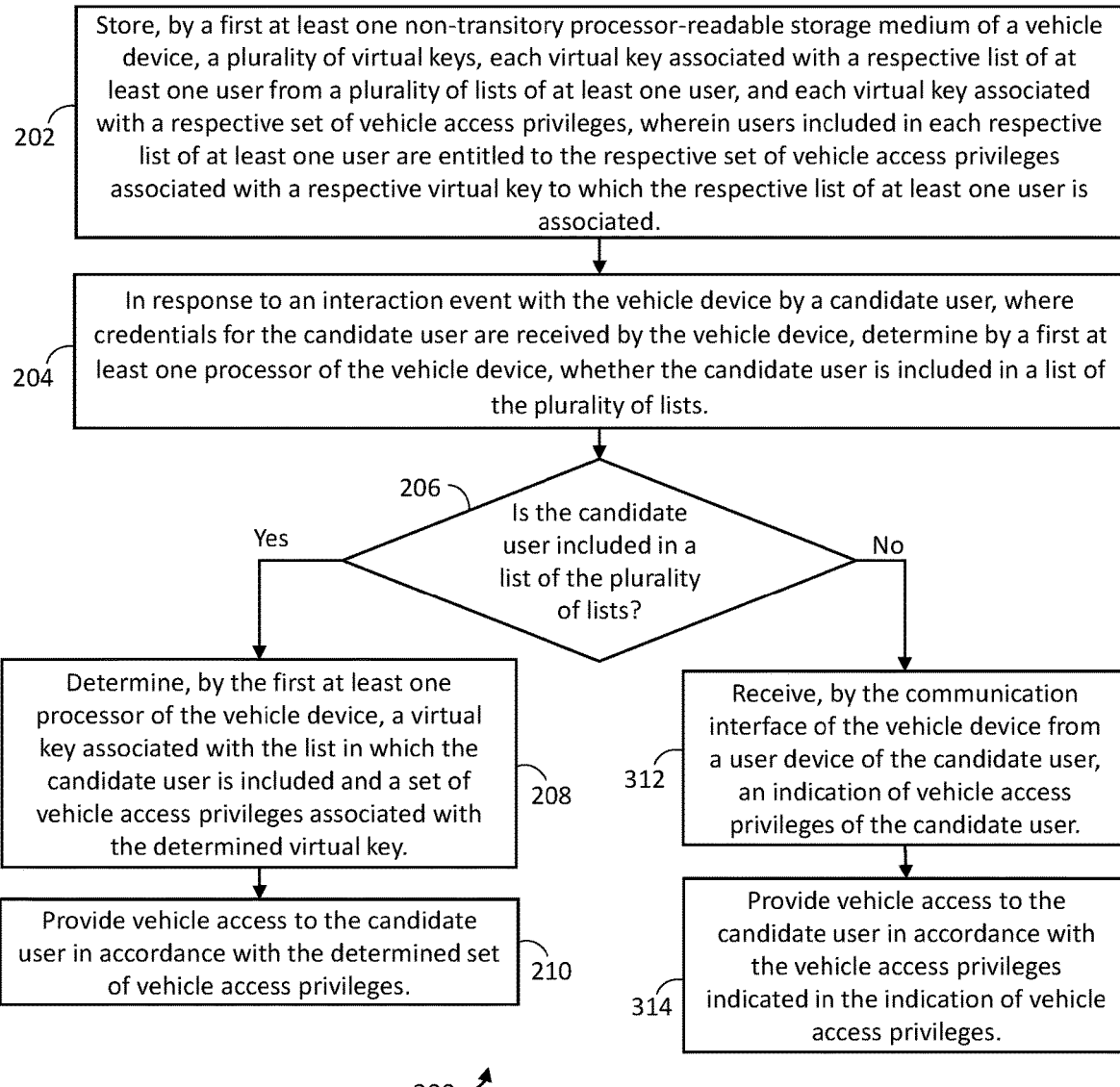

FIG. 3 is a flowchart diagram which illustrates an exemplary method 300 performed by devices such as those in FIG. 1. Method 300 as illustrated includes acts 202, 204, 206, 208, 210, 312, and 314. One skilled in the art will appreciate that additional acts could be added, acts could be removed, or acts could be reordered as appropriate for a given application. With reference to the example illustrated in FIG. 1, acts can be performed by appropriate components of reservation management device 110, vehicle devices 122, or user device 130. Further, any of the at least one non-transitory processor-readable storage mediums 116, 126, or 136 could have instructions stored thereon, which when executed by a respective at least one processor (processors 114, 124, or 134) cause the respective reservation management device 110, vehicle devices 122, or user device 130 to perform a given act of method 300. In the discussion of method 300 below, reference to an act being performed by at least one processor 124 refers to the act being performed by any of processors 124a, 124b, 124c, or 124d. Reference to an act being performed by at least one non-transitory processor-readable storage medium 126 refers to the act being performed by any of non-transitory processor-readable storage mediums 126a, 126b, 126c, or 126d. Reference to an act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device).

Acts 202, 204, 206, 208, and 210 in method 300 are similar to acts 202, 204, 206, 208, and 210 in method 200, and discussion of these acts above with reference to method 200 is applicable to method 300 as well.

Some differences between method 300 and method 200 occurs in the acts performed when (at 204 and 206) the candidate user is not included in a list of the plurality of lists on the at least one non-transitory processor-readable storage medium of the vehicle device (e.g. any of non-transitory processor-readable storage mediums 126 of vehicle devices 122).

If the candidate user is not included in a list of the plurality of lists on the at least one non-transitory processor-readable storage medium of the vehicle device, at 312 the communication interface of the vehicle device (e.g. any of communication interfaces 128 of vehicle device 122) receives an indication of vehicle access privileges of the candidate user from a user device of the candidate user. This can be the same user device as used in the interaction event with the vehicle by the candidate user at 204.

At 314, vehicle access is provided to the candidate user in accordance with the vehicle access privileges indicated in the indication of vehicle access privileges. Providing vehicle access to the candidate user is similar to as discussed above regarding act 210, and discussion of act 210 is applicable to act 314 unless context requires otherwise.

In some implementations, receiving an indication of vehicle access privileges of the candidate user, as in act 312, comprises: receiving, by the communication interface of the vehicle device from the user device, a specified list of at least one user including the candidate user associated with a specified set of vehicle access privileges. In such exemplary implementations, the user device itself provides information to the vehicle device, which is used for determining vehicle access privileges and providing vehicle access.

In one exemplary implementation, a reservation (e.g., list of at least one user, and or virtual key) of the candidate user for the vehicle can be downloaded to the user device from a reservation management device, prior to the candidate user being provided with vehicle access. This can be useful if the vehicle device does not have network access, such as if the vehicle is parked in an area with poor or no cellular reception (e.g. in an underground parkade). As one example, in a scenario where the vehicle belongs to a rental vehicle fleet, the candidate user may reserve the vehicle, where the reservation is processed by the reservation management system. The vehicle may not have network access, and so information regarding the reservation is not received by the vehicle device of the vehicle. Instead, reservation information is downloaded to the user device of the candidate user. When the candidate user interacts with the vehicle device by the user device (e.g. by connecting user device 130 to a vehicle device 122 over communication interfaces 136 and 126, which can include short range communication interfaces such as Bluetooth®, NFC, or RFID), the reservation information is transferred to the vehicle device.

In some cases, the reservation information downloaded to user device 130 from the reservation management device 110, and sent to a vehicle device 122, comprises a specified list of at least one user including the candidate user associated with a specified set of vehicle access privileges. For example, a specified virtual key associated with a specified set of vehicle access privileges may already be stored on a non-transitory processor-readable storage medium of the vehicle device (e.g. any of non-transitory processor-readable storage mediums 126 of vehicle devices 122), and a specified list of at least one user including the candidate user is downloaded to the user device and sent to the vehicle device, for association with the specified virtual key. For example, the specified list of at least one user can be an existing list of least one user associated with an existing virtual key, and at least one processor of the reservation management device (e.g. the at least one processor 114) can update the existing list of at least one user to include the candidate user. The specified list of at least one user (as updated to include the candidate user) can then be sent to the user device, and in turn sent to the vehicle device.

In other cases, the reservation information downloaded to user device 130 from the reservation management device 110, and sent to vehicle device 122, comprises the specified key associated with the specified list of at least one user and the specified set of vehicle access privileges. For example, when the candidate user makes a reservation with the reservation management device 110, the at least one processor 114 can create the specified virtual key as a new virtual key associated with the specified set of vehicle access privileges, and create the specified list of at least one user as a new list including the candidate user. The specified virtual key and the specified list of at least one user including the candidate user are then transferred from the reservation management device 110 to the user device 130 by communication interfaces 118 and 138. In some cases, only the new specified virtual key may need to be sent to the vehicle device, and not the list of at least one user associated with the new specified virtual key. As one example, if the candidate user is the only user associated with the new specified virtual key, the at least one processor of the vehicle device could create the list of at least one user (the list of the candidate user) in response to receiving the new specified virtual key, since the vehicle device received credentials of the candidate user in the interaction event with the vehicle device.

In each of the above examples, the specified list is received by the communication interface of the vehicle device (e.g. any of communication interfaces 128 of a respective vehicle device 122), and at 314 vehicle access is provided to the candidate user in accordance with the specified set of vehicle access privileges.

In some implementations, the indication of vehicle access privileges in act 312 of method 300 indicates that the candidate user has no vehicle access privileges, in which case providing vehicle access to the candidate user in accordance with the vehicle access privileges indicated in the indication of vehicle access privileges comprises: denying vehicle access to the candidate user. As one example, the indication from the user device could be corrupt, incorrect, or forged, and therefore the candidate user is not entitled to vehicle access privileges.

Figure 4:
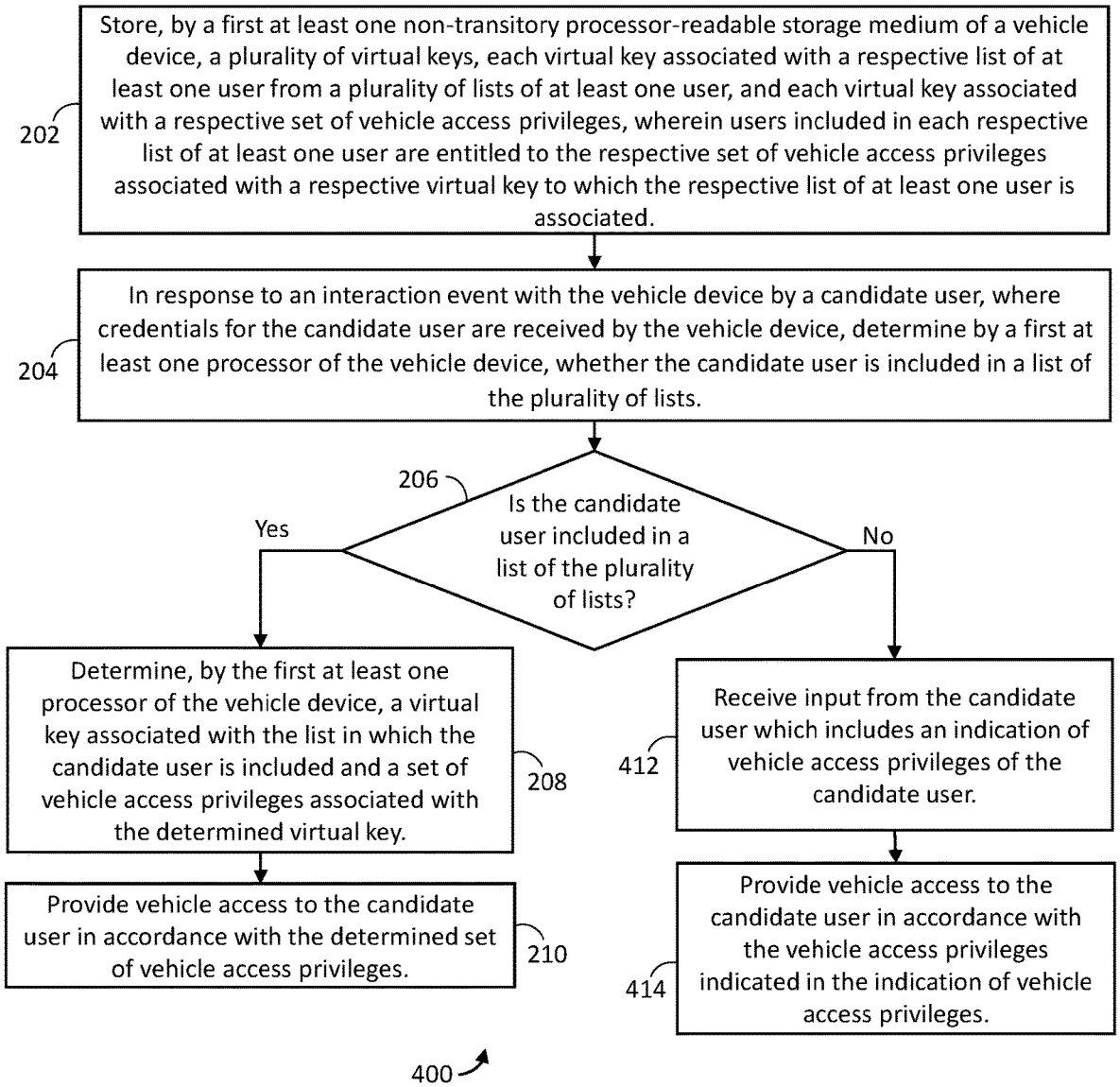

FIG. 4 is a flowchart diagram which illustrates an exemplary method 400 performed by devices such as those in FIG. 1. Method 400 as illustrated includes acts 202, 204, 206, 208, 210, 412, and 414. One skilled in the art will appreciate that additional acts could be added, acts could be removed, or acts could be reordered as appropriate for a given application. With reference to the example illustrated in FIG. 1, acts can be performed by appropriate components of reservation management device 110, vehicle devices 122, or user device 130. Further, any of the at least one non-transitory processor-readable storage mediums 116, 126, or 136 could have instructions stored thereon, which when executed by a respective at least one processor (processors 114, 124, or 134) cause the respective reservation management device 110, vehicle devices 122, or user device 130 to perform a given act of method 400. In the discussion of method 400 below, reference to an act being performed by at least one processor 124 refers to the act being performed by any of processors 124a, 124b, 124c, or 124d. Reference to an act being performed by at least one non-transitory processor-readable storage medium 126 refers to the act being performed by any of non-transitory processor-readable storage mediums 126a, 126b, 126c, or 126d. Reference to an act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device).

Acts 202, 204, 206, 208, and 210 in method 400 are similar to acts 202, 204, 206, 208, and 210 in method 200, and discussion of these acts above with reference to method 200 is applicable to method 400 as well.

Some differences between method 400 and method 200 occurs in the acts performed when (at 204 and 206) the candidate user is not included in a list of the plurality of lists on the at least one non-transitory processor-readable storage medium of the vehicle device (e.g. any of non-transitory processor-readable storage mediums 126 of vehicle devices 122).

If the candidate user is not included in a list of the plurality of lists on the at least one non-transitory processor-readable storage medium of the vehicle device, at 412 the vehicle device receives input from the candidate user which includes an indication of vehicle access privileges of the candidate user. In some implementations, this input is provided via an input device of the vehicle. For example, the vehicle could have a keypad, biometric sensor, or any other appropriate device by which a user can provide input. In this way, the candidate user can input identifying information to the vehicle device, such as name, identity, access code, authentication information, access privileges, or any other appropriate input. In other implementations, the candidate user can provide the input to a user device, which communicates the input to the vehicle device (e.g. via communication interfaces 138 and 128).

At 414, vehicle access is provided to the candidate user in accordance with the vehicle access privileges indicated in the indication of vehicle access privileges. Providing vehicle access to the candidate user is similar to as discussed above regarding act 210, and discussion of act 210 is applicable to act 414 unless context requires otherwise.

In some implementations, receiving input from the candidate user which includes an indication of vehicle access privileges of the candidate user comprises: receiving input from the candidate user which identifies a specified virtual key stored on the at least one non-transitory processor-readable storage medium of the vehicle device (e.g. any of non-transitory processor-readable storage mediums 126), the specified key associated with a specified set of vehicle access privileges. In one example, the candidate user may provide an input which identifies themselves or their role (e.g. a vehicle renter, assigned driver, an administrator, a service person, or other role). Based on the identity or role of the candidate user, the at least one processor of the vehicle device may identify a specific virtual key associated with the candidate user (e.g. corresponding to a reservation by the candidate user), or a virtual key associated with users in the input role (e.g. a virtual key corresponding to administers, or other roles). In another example, the candidate user may input the virtual key itself, or some code which identifies the virtual key (e.g. an abbreviated key or shorter code which corresponds to the virtual key). An existing list of at least one user stored on the at least one non-transitory processor-readable storage medium of the vehicle device associated with the specified virtual key can be updated by the at least one processor of the vehicle device to include the candidate user.

In some implementations, receiving input from the candidate user which includes an indication of vehicle access privileges of the candidate user comprises: receiving input from the candidate user which includes a new virtual key associated with a specified set of vehicle access privileges. For example, the candidate user could input an entire virtual key. As another example, the candidate user could input a code or partial key, from which an entire virtual key can be generated by the at least one processor of the vehicle device. The specified set of vehicle access privileges associated with the new virtual key could also be input by the user, or could be generated by the at least one processor of the vehicle device based on the virtual key or based on credentials of the candidate user (e.g. identity or role). The at least one processor of the vehicle device can also create a new list of at least one user which includes the candidate user, and is associated with the new virtual key. The new virtual key and the new list of at least one user can be stored by the at least one non-transitory processor-readable storage medium of the vehicle device.

In some implementations, if the candidate user is not included in a list of at least one user, the at least one processor of the vehicle device can create a new virtual key associated with a specified set of vehicle access privileges. The specified set of vehicle access privileges associated with the new virtual key could be input by the user, or could be generated by the at least one processor of the vehicle device based on credentials of the candidate user (e.g. and identity or role). The at least one processor of the vehicle device can also create a new list of at least one user which includes the candidate user, and is associated with the new virtual key. The new virtual key and the new list of at least one user can be stored by the at least one non-transitory processor-readable storage medium of the vehicle device.

In each of the above exemplary implementations, at 414 vehicle access is provided to the candidate user in accordance with the specified set of vehicle access privileges associated with the specified or newly generated virtual key.

In some implementations, the indication of vehicle access privileges in act 412 of method 400 indicates that the candidate user has no vehicle access privileges, in which case providing vehicle access to the candidate user in accordance with the vehicle access privileges indicated in the indication of vehicle access privileges comprises: denying vehicle access to the candidate user. As one example, the candidate user may not be a registered user of a vehicle fleet, and therefore may not be entitled to vehicle access privileges. As another example, the candidate user may be a registered user of a vehicle fleet, but a vehicle device with which they have interacted corresponds to a vehicle which is not available (e.g. is reserved for another user), and therefore the candidate user may not be entitled to vehicle access privileges for said vehicle at the time of interest.

Figures 5, 6:
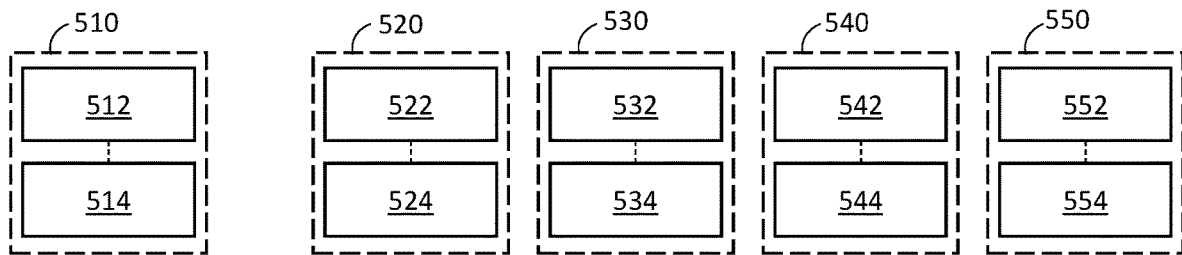
FIG. 5 is a schematic diagram for virtual key storage in any of the device discussed herein.
FIG. 6 is a table which illustrates an exemplary set of virtual keys.

FIG. 5 is a schematic diagram for virtual key storage in the context of any of the devices discussed herein. The storage scheme discussed with reference to FIG. 5 is applicable to storage of any virtual keys discussed herein, including by any of non-transitory processor-readable storage mediums 116, 126, or 136 discussed with reference to FIG. 1, as examples. Further, the storage scheme discussed with reference to FIG. 5 is applicable to storage of virtual keys in any of the methods discussed herein, including method 200 in FIG. 2, method 300 in FIG. 3, and method 400 in FIG. 4.

FIG. 5 illustrates a plurality of slots 510, 520, 530, 540, and 550, in which virtual keys can be stored. The plurality of slots can be, for example, on any of the non-transitory processor-readable storage mediums 126 (or non-transitory processor-readable storage mediums 116 or 136). In the example illustrated in FIG. 5, each slot can store a respective virtual key: slot 510 stores virtual key 512, slot 520 stores virtual key 522, slot 530 stores virtual key 532, slot 540 stored virtual key 542, and slot 550 stores virtual key 552. However, this is not necessarily the case; for example, in some scenarios at least one slot can be empty. Further, although five slots are illustrated in the example, any appropriate number of slots could be used, such as two slots, three slots, four slots, ten slots, twenty slots, or even more slots.

FIG. 5 also illustrates a respective list of at least one user associated with each virtual key: list 514 is associated with virtual key 512, list 524 is associated with virtual key 522, list 534 is associated with virtual key 532, list 544 is associated with virtual key 542, and list 554 is associated with virtual key 552. A respective set of vehicle access privileges can be associated with each virtual key. In this way, each user in a list of at least one user associated with a given virtual key is entitled to the set of vehicle access privileges associated with the given virtual key.

Sets of vehicle access privileges do not have to be unique to a specific virtual key (though they can be). For example, two different users may have reservations to use a vehicle, at different times. Separate virtual keys may be stored in separate slots, each virtual key for a respective user. However, each virtual key may be associated with the same set of vehicle access privileges (that is, each user may be granted the same permissions to use functions of the vehicle during their rental period).

FIG. 5 illustrates five virtual keys slots: slot 510 is an "active" virtual key slot, whereas slots 520, 530, 540, and 550 are "non-active" virtual key slots. Although FIG. 5 illustrates four non-active key slots (slots 520, 530, 540, and 550), any appropriate number of virtual key slots could be implemented in a given application.

Vehicle access can be controlled according to what virtual key is in the "active" key slot. That is, vehicle access can be provided to a user included in a list of at least one user associated with a virtual key in the active virtual key slot, in accordance with the set of vehicle access privileges associated with the virtual key in the active key slot. In the example shown in FIG. 5, with virtual key 512 stored in virtual key slot 510, vehicle access is provided to a user in list 514, according to a set of vehicle access privileges associated with virtual key 512. The remaining non-active virtual key slots can store respective virtual keys for future or alternate use (e.g. future vehicle reservations, administrator usage, cleaner usage, service work usage, or any other appropriate use).

In order to provide vehicle access to a candidate user if the candidate user is included in a list of at least one user as in acts 210 in methods 200, 300, and 400 in FIGS. 2, 3, and 4, a determined virtual key associated with the list of at least one user can be stored in the active key slot. With reference to FIG. 5 for example, if the candidate user is determined as being in list 524, virtual key 522 associated with list 524 is identified. Virtual key 522 can then be stored in virtual key slot 510 (the active key slot), and vehicle access is provided in accordance with a set of vehicle access privileges associate with virtual key 522. In some implementations, storing virtual key 522 in slot 510 could involve copying or duplicating virtual key 522, such that virtual key 522 is stored in both slot 510 and slot 520. In other implementations, virtual key 522 can be stored in slot 510, and deleted from slot 520 to make room for another virtual key. In such a case, virtual key 512 could then be stored in slot 520, if desired.

In order to provide vehicle access to a candidate user if the candidate user is not included in a list of at least one user as in act 216 in method 200 in FIG. 2, act 314 in method 300 in FIG. 3, or act 414 in method 400 in FIG. 4, a virtual key associated with the vehicle access privileges indicated in a respective indication of vehicle access privileges (as in act 214 in method 200 in FIG. 2, act 312 in method 300 in FIG. 3, or act 412 in method 400 in FIG. 4) is stored in the active virtual key slot. As an example, in cases where a virtual key is received by a vehicle device from a reservation management device (as can be the case in act 214 of method 200), or from a user device (as can be the case in act 312 of method 300), the received virtual key can be stored directly in the active virtual key slot (slot 510 in FIG. 5). An associated list of at least one user which includes the candidate user can also be stored in or associated with the active key slot. As another example, in cases where a virtual key is created by a vehicle device (as can be the case in act 312 of method 300, or act 412 of method 400), the created virtual key can be stored directly in the active virtual key slot (slot 510 in FIG. 5). An associated list of at least one user which includes the candidate user can also be stored in or associated with the active key slot.

The virtual key slot structure illustrated in FIG. 5 is useful for storing a plurality of keys, some of which can be associated with different users or different sets of vehicle access privileges. In one exemplary scenario, active virtual key slot 510 can store a virtual key for a current reservation of the vehicle, non-active virtual key slot 520 can store a virtual key for a next reservation of the vehicle, non-active virtual key slot 530 can store a virtual key for administrators or service persons who are entitled to full vehicle access privileges, non-active virtual key slot 540 can store a virtual key for vehicle cleaning staff, who are entitled to limited vehicle access privileges (e.g. unlocking doors only, not driving of the vehicle), and non-active virtual key slot 550 can be left open for any intervening reservations that may arise. This specific use case for key slots is merely exemplary, and virtual key slots could be utilized or allocated in any manner as appropriate for a given application.

Each of the devices in FIG. 1 does not have to store virtual keys in the same number of slots. For example, the five virtual key slots illustrated in FIG. 5 could be how virtual keys are stored on at least one non-transitory processor-readable storage medium 126 of a vehicle device 122. This could be because storage space on at least one non-transitory processor-readable storage medium 126 may be limited. However, at least one non-transitory processor-readable storage medium 116 of reservation management device 110 may have more storage space, and may be able to store a higher number of virtual keys compared to at least one non-transitory processor-readable storage medium 116. In such an implementation, virtual keys can be moved from reservation management device 110 to a vehicle device 122 as needed, to accommodate the lower storage space of at least one non-transitory processor-readable storage medium 126.

FIG. 6 is a table which illustrates an exemplary set of virtual keys, and exemplary time stamps associated therewith. In the leftmost column, virtual key IDs for five keys are listed: virtual keys 610, 620, 630, 640, and 650. Although five virtual keys are illustrated in the example, any number of virtual keys could be used as appropriate for a given application. In the middle column, a Beginning Time Stamp is shown for each virtual key (e.g. a time at which the virtual key is created). In the example, virtual key 610 was created at a reference time t1. The remaining virtual keys are created some time later than t1. In particular, virtual key 620 was created at time t1+100 (e.g. minutes, though any appropriate time scale could be used, such as seconds, hours, days, etcetera), virtual key 630 was created at time t1+200, virtual key 640 was created at time t1+300, and virtual key 650 was created at time t1+400. The selection of t1, and the other times relative thereto, are merely exemplary, and any appropriate time t1 could occur, for any of the virtual keys (i.e. virtual key 610 does not have to be the first-created virtual key). Each of the virtual keys also has an ending time stamp later than t1 (i.e. each virtual key is associated with an expiry time). In the example of FIG. 6, virtual key 610 has an expiry time of t1+4000 (e.g. minutes, though any appropriate time scale could be used, such as seconds, hours, days, etcetera), virtual key 620 has an expiry time of t1+3000, virtual key 630 has an expiry time of t1+2000, virtual key 640 has an expiry time of t1+500, and virtual key 650 has an expiry time of t1+1000. The listed expiry times are merely exemplary, and any appropriate expiry times could occur in a given application.

Sometime after a virtual key has expired (after an ending time stamp of the virtual key), said virtual key can be removed from storage. For example, for a plurality of virtual keys stored on any of non-transitory processor-readable storage mediums 126 of vehicle devices 122, expired virtual keys can be removed (e.g. deleted or de-indexed) from the respective non-transitory processor-readable storage mediums 126. Similarly, for a plurality of virtual keys stored on the at least one non-transitory processor-readable storage medium 116 of reservation management device 110, expired virtual keys can be removed (e.g. deleted or de-indexed) the at least one non-transitory processor-readable storage medium 116. Such removal of expired virtual keys can be performed on the device in which the removal occurs, or can occur in communication with other devices as discussed below.

In some implementations, any of the methods discussed herein (method 200 in FIG. 2, method 300 in FIG. 3, and method 400 in FIG. 4) can include sending a status report from the vehicle device (e.g. an of vehicle devices 122a, 122b, 122c, or 122d) to be received by a reservation management device (e.g. reservation management device 110). The status report can indicate the plurality of virtual keys stored on at least one non-transitory processor-readable storage medium of the vehicle device (e.g. the at least one non-transitory processor-readable storage medium 126a, 126b, 126c, or 126d). The status report is useful for managing updating and changing of virtual keys and associated data on the vehicle device. In some implementations, the status report could be sent from the vehicle device at regular intervals (i.e. periodically). In some implementations, the status report can be sent from the vehicle device in response to a status report request from the reservation management device.

In some implementations, the status update indicates an expiry time for each virtual key of a plurality of virtual keys stored on the non-transitory processor-readable storage medium of the vehicle device. The at least one processor of the reservation management device (e.g. the at least one processor 114) determines whether any virtual keys of the plurality of virtual keys has expired based on the expiry time for each key as indicated in the status report. The at least one processor of the reservation management device can update the plurality of virtual keys to remove any expired keys. The reservation management device provides the updated plurality of keys to the vehicle device (e.g. by communication interface 118). The vehicle device receives (e.g. by communication interface 128) the updated plurality of virtual keys which does not include expired virtual keys, and stores the updated plurality of virtual keys in the at least one non-transitory processor-readable storage medium of the vehicle device.

In some implementations, the at least one processor of the reservation management device determines whether any new virtual key requests have been received since a previous status update was received from the vehicle device (e.g., the at least one processor of the reservation management device determines whether any new reservation requests have been received since a previous status update from the vehicle device). The at least one processor of the reservation management device determines whether there is an available virtual key slot for each new virtual key request (with reference to key slots on the vehicle device). If there is at least one available virtual key slot, the at least one processor of the reservation management device updates the plurality of virtual keys to add at least one new virtual key corresponding to each new virtual key request in available slots. In some implementations, an "available virtual key slot" may be determined as a key slot which contains an expired virtual key, and updating the plurality of virtual keys can include replacing the expired key with a new virtual key associated with a new virtual key requests. The reservation management device provides the updated plurality of virtual keys to the vehicle device (e.g. by communication interface 118). The vehicle device receives (e.g. by communication interface 128) the updated plurality of virtual keys which includes at least one additional virtual key, and stores the updated plurality of virtual keys in the at least one non-transitory processor-readable storage medium of the vehicle device. In this implementation, the entire plurality of keys stored on the at least one non-transitory processor-readable storage medium of the vehicle device can be replaced with the updated plurality of keys, even if certain keys in the updated plurality of virtual keys have not been updated.

In some implementations, the entire plurality of virtual keys on the at least one non-transitory processor-readable storage medium of the vehicle device does not need to be replaced; instead, only virtual keys which need to be added, updated, or replaced can be added, updated, or replaced. In one example, the at least one processor of the reservation management device determines whether there is at least one new virtual key request compared to a plurality of virtual keys indicated in the status report. If there is at least one new virtual key request, the reservation management device sends (e.g. by the communication interface 118) a new at least one virtual key to be added to the vehicle device based on the new virtual key request. The vehicle device receives (e.g. by communication interface 128) the new at least one virtual key. The at least one non-transitory processor-readable storage medium of the vehicle device then stores the new at least one virtual key in appropriate slots. This could include storing the new at least one virtual key in at least one empty slot, or replacing at least one expired virtual key with the new at least one virtual key.

In some implementations, prior to creating or sending the new at least one virtual key, the at least one processor of the reservation management device can determine whether the is at least one available virtual key slot on the at least one non-transitory processor-readable storage medium of the vehicle device, and may refrain from sending the new at least one virtual key to the vehicle device, or may prioritize sending only a subset of the new at least one virtual key based on a number of available slots on the at least one non-transitory processor-readable storage medium of the vehicle device.

In some implementations, the at least one processor of the vehicle device can determine whether there is at least one available virtual key slot on the at least one non-transitory processor-readable storage medium of the vehicle device, and discard new virtual keys received from the reservation management system for which there is no available slot.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system for managing shared access to a vehicle, the system comprising:
   a vehicle device installable to the vehicle, the vehicle device including a first communication interface, a first at least one processor, and a first at least one non-transitory processor-readable storage medium communicatively coupled to the first at least one processor, wherein the first at least one non-transitory processor-readable storage medium stores first processor-executable instructions, which when executed by the first at least one processor cause the vehicle device to:
      store, by the first at least one non-transitory processor-readable storage medium, a plurality of virtual keys, each virtual key associated with a respective list of at least one user from a plurality of lists of at least one user, and each virtual key associated with a respective set of vehicle access privileges, wherein users included in each respective list of at least one user are entitled to the respective set of vehicle access privileges associated with a respective virtual key to which the respective list of at least one user is associated;
      in response to an interaction event with the vehicle device by a candidate user, where credentials for the candidate user are received by the vehicle device, determine by the first at least one processor whether the candidate user is included in a list of the plurality of lists;

if the candidate user is included in a list of the plurality of lists:
  determine, by the first at least one processor, a virtual key associated with the list in which the candidate user is included and a set of vehicle access privileges associated with the determined virtual key; and
  provide vehicle access to the candidate user in accordance with the determined set of vehicle access privileges, by providing a vehicle access mechanism which controls access to the vehicle with control instructions from the first at least one processor; and if the candidate user is not included in a list of the plurality of lists:
  receive input from the candidate user which includes an indication of vehicle access privileges of the candidate user; and
  provide vehicle access to the candidate user in accordance with the vehicle access privileges indicated in the indication of vehicle access privileges, by providing the vehicle access mechanism with control instructions from the first at least one processor.

2. The system of claim 1, wherein:
the input from the candidate user which includes the indication of vehicle access privileges of the candidate user comprises: input from the candidate user which identifies a specified virtual key stored on the first at least one non-transitory processor-readable storage medium, the specified virtual key associated with a specified set of vehicle access privileges; and
vehicle access is provided to the candidate user in accordance with the specified set of vehicle access privileges.

3. The system of claim 2, wherein the first processor-executable instructions further cause the first at least one processor to: update an existing list of at least one user stored on the first at least one non-transitory processor-readable storage medium associated with the specified virtual key to include the candidate user.

4. The system of claim 3, wherein:
the input from the candidate user which includes an indication of vehicle access privileges of the candidate user comprises: input from the candidate user which includes a new virtual key associated with a specified set of vehicle access privileges; and
the first processor-executable instructions which cause the vehicle device to provide vehicle access to the candidate user in accordance with the vehicle access privileges indicated in the indication of vehicle access privileges cause the vehicle device to: provide vehicle access to the candidate user in accordance with the specified set of vehicle access privileges.

5. The system of claim 4, wherein the first processor-executable instructions further cause the vehicle device to, if the candidate user is not included in a list of the plurality of lists:
store, by the first at least one non-transitory processor-readable storage medium, the new virtual key and a new list of at least one user associated with the new virtual key which includes the candidate user.

6. The system of claim 1, wherein the first processor-executable instructions further cause the vehicle device to, if the candidate user is not included in a list of the plurality of lists:
create, by the first at least one processor, a new virtual key associated with a specified set of vehicle access privileges; and
create, by the first at least one processor, a new list of at least one user associated with the new virtual key which includes the candidate user,
wherein the first processor-executable instructions which cause the vehicle device to provide vehicle access to the candidate user in accordance with the vehicle access privileges provided in the indication of vehicle access privileges cause the vehicle device to: provide vehicle access to the candidate user in accordance with the specified set of vehicle access privileges.

7. The system of claim 1, wherein the first processor-executable instructions which cause the first at least one non-transitory processor-readable storage medium to store the plurality of virtual keys cause the first at least one non-transitory processor-readable storage medium to: store the plurality of virtual keys in a plurality of virtual key slots, each virtual key of the plurality of virtual keys stored in a respective virtual key slot of the plurality of virtual key slots.

8. The system of claim 7, wherein:
the plurality of virtual key slots includes one active virtual key slot and a plurality of non-active virtual key slots;
access to the vehicle is controlled according to a set of vehicle access privileges associated with a virtual key stored in the active virtual key slot;
the first processor-executable instructions which cause the vehicle device to, if the candidate user is included in a list of the plurality of lists, provide vehicle access to the candidate user in accordance with the determined set of vehicle access privileges cause the first at least one non-transitory processor-readable storage medium to store the determined virtual key in the active virtual key slot; and
the first processor-executable instructions which cause the vehicle device to, if the candidate user is not included in a list of the plurality of lists: provide vehicle access to the candidate user in accordance with the vehicle access privileges provided in the indication of vehicle access privileges cause the first at least one non-transitory processor-readable storage medium to: store a virtual key associated with the vehicle access privileges provided in the indication of vehicle access privileges in the active virtual key slot.

9. The system of claim 8, wherein the first processor-executable instructions which cause the first at least one non-transitory processor-readable storage medium to store the determined virtual key in the active virtual key slot cause the first at least one non-transitory processor-readable storage medium to copy the determined virtual key to the active virtual key slot.

10. The system of claim 8, wherein the plurality of non-active virtual key slots includes four non-active-virtual key slots.

11. The system of claim 1, wherein each virtual key of the plurality of virtual keys is associated with an expiry time, and the first processor-executable instructions further cause the first at least one non-transitory processor-readable storage medium to:
remove keys of the plurality of virtual keys which are expired.

12. The system of claim 1, wherein the first processor-executable instructions further cause the vehicle device to:
    send, by the first communication interface, a status report from the vehicle device to be received by a reservation management device, the status report indicating the plurality of virtual keys stored on the first at least one non-transitory processor-readable storage medium.

13. The system of claim 12, wherein the status report indicates an expiry time for each virtual key of the plurality of virtual keys, and the first processor-executable instructions further cause the vehicle device to:
    receive, by the first communication interface, an updated plurality of virtual keys which does not include expired virtual keys; and
    store, by the first at least one non-transitory processor-readable storage medium, the updated plurality of virtual keys.

14. The system of claim 13, further comprising the reservation management device which includes a second at least one processor, a second at least one non-transitory processor-readable storage medium communicatively coupled to the second at least one processor, and a second communication interface, wherein the second at least one non-transitory processor-readable storage medium stores second processor-executable instructions, which when executed by the second at least one processor cause the reservation management device to:
    determine, by the second at least one processor, whether any virtual keys of the plurality of virtual keys has expired based on the expiry time for each key;
    update, by the second at least one processor, the plurality of virtual keys to remove any expired virtual keys; and
    provide, by the second communication interface, the updated plurality of virtual keys to the vehicle device.

15. The system of claim 12, wherein the first processor-executable instructions further cause the vehicle device to:
    receive, by the first communication interface, an updated plurality of virtual keys which includes at least one additional virtual key not indicated in the status report; and
    store, by the first at least one non-transitory processor-readable storage medium, the updated plurality of virtual keys.

16. The system of claim 15, further comprising the reservation management device which includes a second at least one processor, a second at least one non-transitory processor-readable storage medium communicatively coupled to the second at least one processor, and a second communication interface, wherein the second at least one non-transitory processor-readable storage medium stores second processor-executable instructions, which when executed by the second at least one processor cause the reservation management device to:
    determine, by the second at least one processor, whether any new virtual key requests have been received since a previous status update was received from the vehicle;
    determine, by the second at least one processor, whether there is an available virtual key slot for each new virtual key request;
    update, by the second at least one processor, the plurality of virtual keys to add at least one new virtual key corresponding to each new virtual key request in available key slots; and
    provide, by the second communication interface, the updated plurality of virtual keys to the vehicle device.

17. The system of claim 12, wherein the first processor-executable instructions further cause the vehicle device to:
    receive, by first communication interface, at least one additional virtual key not indicated in the status report; and
    store, by the first at least one non-transitory processor-readable storage medium, the at least one additional virtual key.

18. The system of claim 1, wherein:
    the indication of vehicle access privileges of the candidate user indicates that the candidate user has no vehicle access privileges; and
    the first processor-executable instructions which cause the vehicle device to provide vehicle access to the candidate user in accordance with the vehicle access privileges indicated in the indication of vehicle access privileges cause the vehicle device to: deny vehicle access to the candidate user.

19. The system of claim 1, further comprising the vehicle and the vehicle access mechanism, wherein:
    the vehicle device is installed to the vehicle; and
    the vehicle access mechanism is included in the vehicle.

20. The system of claim 1, wherein:
    the vehicle access mechanism comprises at least one electrically actuated door lock of the vehicle; and
    the control instructions comprise an instruction to cause the at least one electrically actuated door lock to unlock.

21. The system of claim 1, wherein:
    the vehicle access mechanism comprises a key box which contains a physical key to the vehicle; and
    the control instructions comprise an instruction to cause the key box to make the physical key accessible to the candidate user.

22. The system of claim 1, wherein:
    the vehicle access mechanism comprises a key box which contains a remote control for the vehicle, and which includes at least one mechanical actuator operable to press at least one button of the remote control; and
    the control instructions comprise an instruction to actuate the at least one mechanical actuator to press at least one button on the remote control which causes the vehicle to be accessible to the candidate user.

23. The system of claim 1, wherein:
    the vehicle access mechanism comprises a key box which contains a key fob for the vehicle; and
    the control instructions comprise an instruction for the key box to provide power to the key fob, thereby enabling vehicle access to the candidate user.

24. The system of claim 1, wherein:
    the vehicle access mechanism comprises an inhibiting module which prevents activation of at least one component of the vehicle absent an authorization signal; and
    the control instructions comprise the authorization signal that enables activation of the at least one component of the vehicle.

* * * * *